United States Patent
Teng

(10) Patent No.: US 9,185,424 B2
(45) Date of Patent: Nov. 10, 2015

(54) IMAGE DATA COMPRESSION

(75) Inventor: Chia-Yuan Teng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 13/535,020

(22) Filed: Jun. 27, 2012

(65) Prior Publication Data

US 2013/0010864 A1 Jan. 10, 2013

Related U.S. Application Data

(60) Provisional application No. 61/504,510, filed on Jul. 5, 2011.

(51) Int. Cl.
| | | |
|---|---|---|
| *H04N 7/50* | (2006.01) | |
| *H04N 19/436* | (2014.01) | |
| *H04N 19/61* | (2014.01) | |
| *H04N 19/176* | (2014.01) | |
| *H04N 19/172* | (2014.01) | |
| *H04N 19/115* | (2014.01) | |
| *H04N 19/103* | (2014.01) | |
| *H04N 19/112* | (2014.01) | |
| *H04N 19/124* | (2014.01) | |
| *H04N 19/152* | (2014.01) | |

(52) U.S. Cl.
CPC .............. *H04N 19/436* (2014.11); *H04N 7/50* (2013.01); *H04N 19/103* (2014.11); *H04N 19/112* (2014.11); *H04N 19/115* (2014.11); *H04N 19/124* (2014.11); *H04N 19/152* (2014.11); *H04N 19/172* (2014.11); *H04N 19/176* (2014.11); *H04N 19/61* (2014.11)

(58) Field of Classification Search
CPC ... H04N 19/00169; H04N 7/167; H04N 7/50; H04N 7/26244; G06K 9/36
USPC .................. 382/232, 239; 380/202; 375/240, 375/240.12, E7.035
See application file for complete search history.

(56) References Cited

U.S. PATENT DOCUMENTS

| | | | |
|---|---|---|---|
| 5,625,712 | A | 4/1997 | Schoenzeit et al. |
| 5,710,595 | A | 1/1998 | Hang et al. |
| 6,185,253 | B1 | 2/2001 | Pauls |
| 7,502,514 | B2 | 3/2009 | Gringeler et al. |

(Continued)

FOREIGN PATENT DOCUMENTS

| | | |
|---|---|---|
| JP | 2004179725 A | 6/2004 |
| JP | 2006080792 A | 3/2006 |

(Continued)

OTHER PUBLICATIONS

Chiang et al., "A New Rate Control Scheme Using Quadratic Rate Distortion Model," IEEE Transactions on Circuits and Systems for Video Technology, vol. 7, No. 1, Feb. 1997, 5 pp.

(Continued)

*Primary Examiner* — Jorge L Ortiz Criado
*Assistant Examiner* — Albert Kir
(74) *Attorney, Agent, or Firm* — Shumaker & Sieffert, P.A.

(57) ABSTRACT

Techniques described in this disclosure may implement a bit budget-based scheme that indicates the available bit budget for a current image data block to achieve the target compression. The techniques may continuously update the bit budget after the compression of the current image data block to determine the bit budget for the next image data block.

37 Claims, 17 Drawing Sheets

(56) References Cited

U.S. PATENT DOCUMENTS

| | | |
|---|---|---|
| 7,627,181 B2 | 12/2009 | Tamura et al. |
| 7,912,300 B2 | 3/2011 | Matsumoto |
| 7,940,843 B1 | 5/2011 | Nie et al. |
| 2004/0125952 A1* | 7/2004 | Alattar et al. ............... 380/202 |
| 2006/0050974 A1* | 3/2006 | Tamura et al. ............... 382/232 |
| 2008/0069457 A1 | 3/2008 | Matsumoto |
| 2010/0104021 A1 | 4/2010 | Schmit |
| 2014/0192867 A1 | 7/2014 | Yamaguchi et al. |
| 2014/0254949 A1* | 9/2014 | Chou et al. ............... 382/239 |

FOREIGN PATENT DOCUMENTS

| | | |
|---|---|---|
| JP | 2007181051 A | 7/2007 |
| JP | 2007281758 A | 10/2007 |
| JP | 2008042687 A | 2/2008 |
| JP | 2010004514 A | 1/2010 |
| JP | 2013005414 A | 1/2013 |
| KR | 19970073127 A | 11/1997 |
| KR | 100383684 | 8/2003 |
| KR | 20070090168 A | 9/2007 |
| WO | WO0049571 A2 | 8/2000 |
| WO | 0228108 A2 | 4/2002 |

OTHER PUBLICATIONS

International Preliminary Report on Patentability—PCT/US2012/044610—The International Bureau of WIPO Geneva, Switzerland, Nov. 11, 2013, 32 pp.

International Search Report and Written Opinion—PCT/US2012/044610—ISA/EPO—Sep. 14, 2012, 18 pp.

Yu et al., "An Improved Rate Control Algorithm for H.264," IEEE International Symposium on Circuits and Systems (ISCAS), May 23-26, 2005, 4 pp. XP010815540, DOI: 10.1109/ISCAS.2005.1464587 ISBN: 978-0-7803-8834-5.

Reply to Written Opinion dated Sep. 14, 2012, from international application No. PCT/US2012/044610, dated May 1, 2013, 12 pp.

Second Written Opinion of international application No. PCT/US2012/044610, mailed Jun. 6, 2013, 7 pp.

Second Reply to Written Opinion mailed Jun. 6, 2013, from international application No. PCT/US2012/044610, dated Aug. 6, 2013, 26 pp.

Nakamae, et al., "A Near-Lossless Image Compression Method for Frame Memory Size Reduction", Technical Report of the IEICE, Japan, The Institute of Electronics, Information and Communication Engineers, Jun. 23, 2011, vol. 111, pp. 163-168.

* cited by examiner

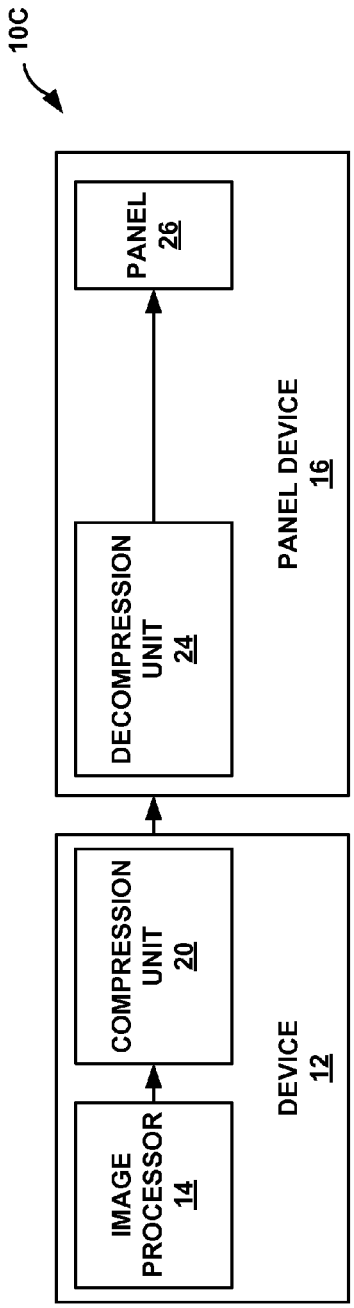
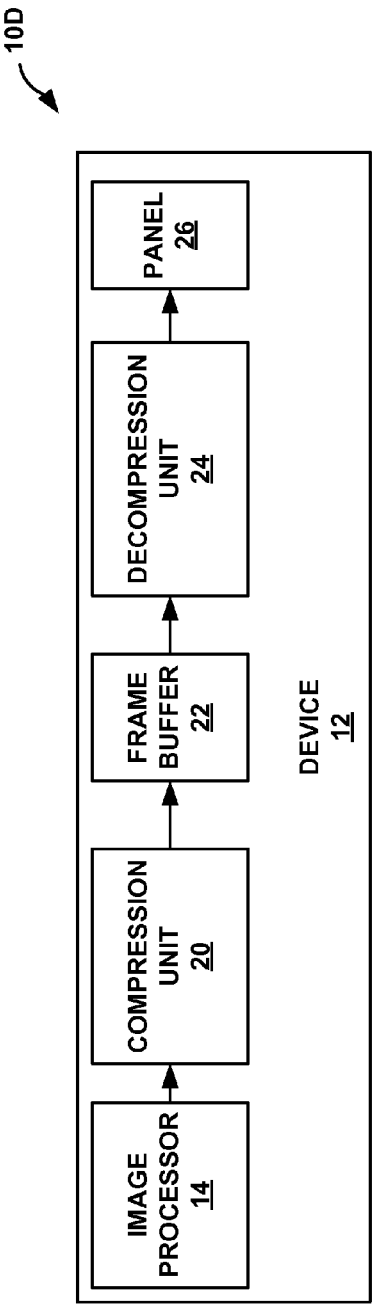
FIG. 1C
FIG. 1D

Table 3.

IMAGE DATA COMPRESSION

This application claims the benefit of U.S. Provisional Application No. 61/504,510, filed Jul. 5, 2011, the content of which is incorporated herein by reference in its entirety.

TECHNICAL FIELD

This disclosure is directed to image data, and particularly, to the compression of image data.

BACKGROUND

Various units such as video decoders and graphics processing units (GPUs) compose image frames. For example, video decoders may compose a series of video pictures that are displayed sequentially for smooth video playback. GPUs may compose graphics content for an executing application such as a video game. A camera processor may compose an image captured by a camera. Image frames may generally refer to any viewable content such as the composed graphics content from the GPUs, video pictures from the video decoders, and the image captured by the camera, as a few examples.

The various units may output the composed image frames to a frame buffer for storage. For example, the frame buffer may store pixel values for the pixels of the image frames. A display may receive the pixel values from the frame buffer and display the image frames as viewable content based on the pixel values. In alternate examples, the various units may output the image frames to the display without first storing the image frame in the frame buffer.

SUMMARY

In general, this disclosure is related to techniques for data compression so that the amount of data that needs to be stored in a frame buffer or transmitted is reduced. The data compression techniques may be a budget-based compression scheme that allows for selection between different compression modes or selection between compressed data compressed using different compression modes to achieve a target compression. For example, the budget-based compression scheme may continuously update a bit budget that indicates how many bits are available to achieve the target compression. Based on the current bit budget, the budget-based compression scheme may select a particular compression mode or compressed data compressed in accordance with a particular compression mode that result in the data being compressed to the desired level.

In one example, the disclosure describes a method that includes determining, with a compression unit, a current bit budget for a current block of pixel values of an image frame based at least on a previous bit budget, a number of bits of a previous compressed block, and a compressed bit threshold value that indicates a number of bits that are guaranteed available for each of the blocks of the image frame for compression. The method also includes performing, with the compression unit, a lossless compression on the current block to generate a lossless compressed block. The method further includes when a number of bits of the lossless compressed block is less than or equal to the current bit budget, outputting, with the compression unit, bits of the lossless compressed block.

In another example, the disclosure describes a system that includes an image processor configured to compose an image frame. The system also includes a compression unit configured to determine a current bit budget for a current block of pixel values of the image frame based at least on a previous bit budget, a number of bits of a previous compressed block, and a compressed bit threshold value that indicates a number of bits that are guaranteed available for each of the blocks of the image frame for compression. The compression unit is also configured to perform a lossless compression on the current block to generate a lossless compressed block, and when a number of bits of the lossless compressed block is less than or equal to the current bit budget, output bits of the lossless compressed block.

In another example, the disclosure describes a compression unit configured to receive an image frame, and determine a current bit budget for a current block of pixel values of the image frame based at least on a previous bit budget, a number of bits of a previous compressed block, and a compressed bit threshold value that indicates a number of bits that are guaranteed available for each of the blocks of the image frame for compression. The compression unit is also configured to perform a lossless compression on the current block to generate a lossless compressed block, and when a number of bits of the lossless compressed block is less than or equal to the current bit budget, output bits of the lossless compressed block.

In another example, the disclosure describes a system that includes means for determining a current bit budget for a current block of pixel values of an image frame based at least on a previous bit budget, a number of bits of a previous compressed block, and a compressed bit threshold value that indicates a number of bits that are guaranteed available for each of the blocks of the image frame for compression. The system also includes means for performing a lossless compression on the current block to generate a lossless compressed block, and when a number of bits of the lossless compressed block is less than or equal to the current bit budget, means for outputting bits of the lossless compressed block.

In another example, the disclosure describes a computer-readable storage medium including instructions stored thereon that when executed cause one or more processors to determine a current bit budget for a current block of pixel values of an image frame based at least on a previous bit budget, a number of bits of a previous compressed block, and a compressed bit threshold value that indicates a number of bits that are guaranteed available for each of the blocks of the image frame for compression. The instructions also cause the one or more processors to perform a lossless compression on the current block to generate a lossless compressed block, and when a number of bits of the lossless compressed block is less than or equal to the current bit budget, output bits of the lossless compressed block.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 1A-1D are block diagrams illustrating systems that may implement one or more example techniques described in this disclosure.

DETAILED DESCRIPTION

Figure 1A:
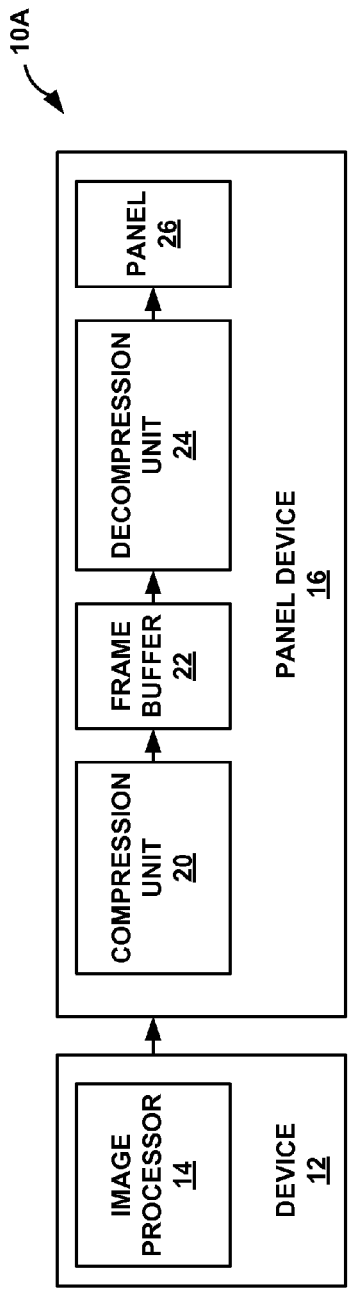

This disclosure describes a compression unit that receives data (e.g., pixel values) for composed image frames and compresses the data. By compressing the data, the techniques described in this disclosure may reduce the amount of data that needs to be stored in a frame buffer and/or reduce the amount of data that needs to be transmitted. In other words, without compression the amount of data that needs to be stored in the frame buffer and/or transmitted may be greater than the amount of data that needs to be stored in the frame buffer and/or transmitted with compression.

As a few examples, image frames may be pictures of video content composed by a video decoder, graphics content composed by a graphics processing unit (GPU), or images captured by a camera and composed by a camera processor. In general, an image frame may be any example of image content that is to be displayed on a display including the results of executing applications that generate viewable content such as web browsers, games, media players, and the like.

The image frame may be defined by a plurality of pixel values that each correspond to a pixel on the display. Also, the units that compose the image frame (e.g., the video decoder, GPU, and camera processor) may be commonly referred to as an image processor. In other words, examples of the image processor include one or more of a video decoder, GPU, camera processor, and any other unit that composes an image frame for display.

The compression unit may receive the pixel values for pixels of the composed image frame from any one of the video decoder, GPU, and camera processor. Each of the pixel values may be represented by a plurality of data bits. For instance, one example of the pixel values may be color values that include data bits for red, green, and blue (RGB) components. As an example, eight data bits may represent the red component of a pixel, eight data bits may represent the green component of a pixel, and eight data bits may represent the blue component, for a total of 24 bits for the color value.

The compression unit may receive the data bits of the pixel values for each of the pixels in the image frame, and apply compression so that fewer bits are needed to represent the color value. The compression unit may similarly compress other types of pixel values such as opacity values and coordinates, as two examples. As used in this disclosure, the term "image data" may refer generally to bits of the pixel values, and the term "compressed image data" may refer to the output of the compression unit after compression unit compresses the image data. For example, the number of bits in the compressed image data may be less than the number of bits in the image data.

To compress the image data, the compression unit may implement a budget-based compression scheme. The compression unit may implement the budget-based compression scheme to the entirety of the image frame, a slice of the image frame, or line-by-line. As described in more detail, in accordance with the budget-based compression scheme, the compression unit may continuously update a bit budget that indicates the amount of bits that are available for a current block of pixels to achieve the target compression.

In some examples, the compression unit may compress the image data utilizing various compression techniques including lossless and lossy compression techniques. The compression unit may select the output of the compression technique that meets the current bit budget. In some other examples, the compression unit may determine which type compression technique should be applied to the image data, and compress the image data based on the determined compression technique.

As described in more detail, in some examples, the compression unit may be biased towards lossless compression over lossy compression. For example, if utilizing both lossless and lossy compression results in the compressed image data that meets the bit budget, then the compression unit may compress the image data using lossless compression. Lossless compression may allow for full recovery of the original image data with decompression, whereas with lossy compression the reconstructed image data may not be identical to the original image data after decompression. Accordingly, the compression unit may prefer lossless compression over lossy compression so that it is possible to fully recover the original image data during decompression.

Furthermore, when performing lossy compression, the compression unit may perform lossy compression such that the number of bits in the compressed image data, as compressed by lossy compression, is guaranteed to be less than the current bit budget. In this manner, if the number of bits in the lossless compressed image data is greater than current bit budget, then the compression unit may select the lossy compression. Accordingly, the compression unit may be configured to always output a compressed block that meets the current bit budget.

Figure 1B:
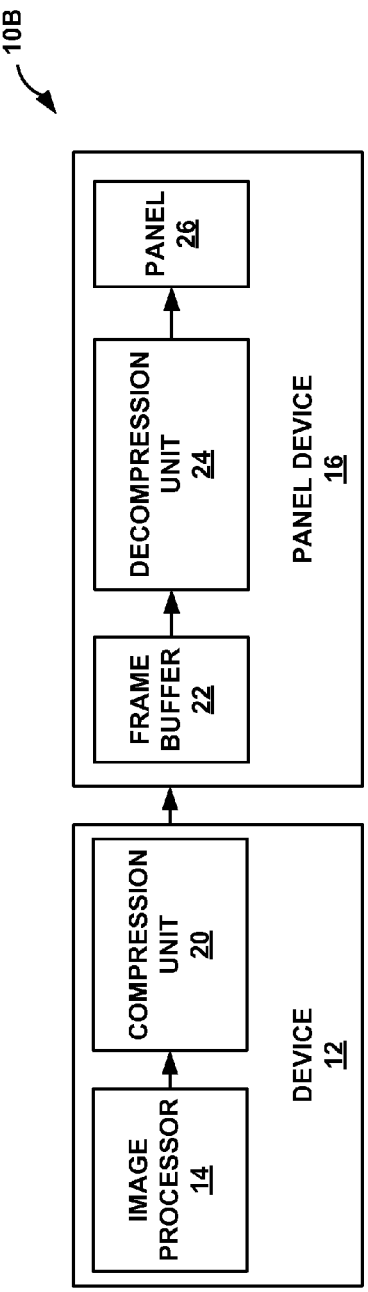

FIGS. 1A-1D are block diagrams illustrating systems that may implement one or more example techniques described in this disclosure. For instance, FIGS. 1A-1D illustrate systems 10A-10D, respectively. In FIGS. 1A-1C, systems 10A-10C include device 12 and panel devoce 16, and in FIG. 1D, system 10D includes devoce 12 without panel devoce 16. Examples of devoce 12, in FIGS. 1A-1D, include, but are not limited to, video devices such as media players, set-top boxes, wireless handsets such as mobile telephones or so-called smartphones, personal digital assistants (PDAs), desktop computers, laptop computers, gaming consoles, digital cameras, video conferencing units, tablet computing devices, personal multimedia players, and the like. Examples of panel devoce 16, in FIGS. 1A-1C, include, but are not limited to, televisions, monitors, liquid crystal displays (LCDs), organic LEDs (OLEDs), plasma displays, display screens of any of the video devices mentioned above, or generally any device that displays images.

In systems 10A-10D, devoce 12 includes image processor 14. Image processor 14 may be any component that generates a fully composed image frame. An image frame may be any viewable content that is to be displayed including the results of executing applications that generate viewable content. For instance, examples of image processor 14 include, but are not limited to, any one or more of a video decoder, a graphics processing units (GPU), and a camera processor. Examples of image frames include, but are not limited to, any one or more of a picture of video content composed by the video decoder, graphics content composed by the GPU, or an image captured by a camera and composed by the camera processor.

The image frame may be considered as including pixel values for a plurality of pixels. For instance, the image frame may be considered as a two-dimensional array of pixel values, where each pixel value may correspond to one pixel of panel 26. For example, panel 26 in FIGS. 1A-1D may display the image frame, and panel 26 may illuminate its pixels based on the corresponding pixel values of the image frame.

The pixel values of the image frame may be defined by a plurality of digital bits. For instance, one example of pixel values is color values. The color values are generally defined a by red, green, and blue (RGB) components although other color spaces could also be used. In some example, image processor 14 may define the red component with 8 bits, the green component with 8 bits, and the blue component with 8 bits, for a total of 24 bits. In this example, each of the pixel values for each of the pixels of the image frame composed by image processor 14 may include at least 24 bits.

Image processor 14 may similarly represent other examples of pixel values such as opacity values and pixel coordinates with digital bits. For purposes of illustration and ease of description, the techniques described in this disclosure are described in context of the color values that are represented by RGB components. In other words, the techniques described in this disclosure are described with examples where the number of bits that image processor 14 utilizes to define a pixel value is 24 bits. However, aspects of this disclosure are not so limited, and the techniques described herein may be extended to examples where a pixel value is defined by more or fewer than 24 bits.

In FIGS. 1A-1D, image processor 14 may transmit the pixel values to compression unit 20. In the example of FIG. 1A, compression unit 20 may reside within panel devoce 16, and in the examples of FIGS. 1B-1D, compression unit 20 may reside within devoce 12. Also, in the examples of FIGS. 1B-1D, although compression unit 20 is illustrated as being external to image processor 14, aspects of this disclosure are not so limited. In other examples, compression unit 20 may be a part of image processor 14. For ease of description, compression unit 20 is described as being external to image processor 14.

In the example of FIG. 1A, where devoce 12 transmits the pixel values generated by image processor 14 to compression unit 20 in panel devoce 16, or in the examples of FIGS. 1B and 1C, where devoce 12 transmits the output of compression unit 20 to panel devoce 16, devoce 12 and panel devoce 16 may be coupled wirelessly or with a wired link. As one example of the wired link, devoce 12 and panel devoce 16 may be coupled by a High Definition Multimedia Interface (HDMI) cable. In the examples of FIGS. 1B-1D, image processor 14 may transmit the pixel values to compression unit 20 via a system bus of devoce 12 that interconnects the various components of devoce 12. In examples where image processor 14 includes compression unit 20, image processor 14 may transmit the pixel values to compression unit 20 without requiring the system bus of devoce 12.

In the examples of FIGS. 1A-1C, devoce 12 may include an interface that converts the output of image processor 14 (in FIG. 1A) or the output of compression unit 20 (in FIGS. 1B and 1C) into a format suitable for transmission to panel devoce 16, and panel devoce 16 includes an interface to receive the output from devoce 12. For instance, FIGS. 1A-1C illustrate examples in which the image frame is generated in one device (i.e., devoce 12), but the image frame is displayed in another device (i.e., panel devoce 16). In these examples of FIGS. 1A-1C, devoce 12 includes an interface that allows devoce 12 to transmit to panel devoce 16, and panel devoce 16 includes an interface that allows panel 16 to receive from devoce 12. In the example of FIG. 1D, there may be no panel devoce 16 because devoce 12 may be the device that both generates the image frame and presents the image frame.

Compression unit 20, in any of the examples of FIGS. 1A-1D, may be configured to receive the pixel values generated by image processor 14 and apply compression. As described above, the pixel values generated by image processor 14 may be a plurality of bits that represent the color. Compression unit 20 may apply compression so that fewer bits are needed to represent the color. As an example, as described above, one pixel value may be 24 bits; therefore, eight pixel values may be 192 bits. In this example, if 50% compression is desired, compression unit 20 receives the 192 bits and applies compression to reduce the total number of bits to 96 bits (i.e., compresses the bits by 50% in this example because 192 bits*50% equals 96 bits). In this example, the resulting 96 bits may represent the eight pixel values, rather than 192 bits for the eight pixel values.

For purposes of clarity, as used in this disclosure, the term "image data" may refer generally to the bits of the pixel values, and the term "compressed image data" may refer to output of compression unit 20 after compression unit 20 compresses the image data. In aspects of this disclosure, the number of bits in the compressed image data may be less than the number of bits in the image data. For instance, keeping with the previous example, compression unit 20 may receive 192 bits of image data (e.g., 192 bits for eight pixel values), and compress the 192 bits of image data into 96 bits of compressed image data to achieve 50% compression.

In FIGS. 1A, 1B, and 1D, compression unit 20 may output the compressed image data to frame buffer 22. Frame buffer 22 may store the compressed image data. An example of frame buffer 22 is random access memory (RAM); however, other types of memory may be possible. By compressing the image data prior to storage in frame buffer 22, the techniques of this disclosure may allow for a reduction in the size of frame buffer 22.

For example, assume that image processor 14 generated 1280×800 pixel values, for a total of 24,576,000 bits (i.e., 1280*800 pixel values*24 bits/pixel value equals 24,576,000 bits). Without compression unit 20, frame buffer 22 may need to be able to store 24,576,000 bits, in this example. However, if compression unit 20 compressed the image data by 50%, then frame buffer 22 may need to be able to store 12,288,000 bits (e.g., the compressed image data), allowing for a reduction in the size of frame buffer 22 by 50%. In general, the cost of frame buffer 22 may be proportional to its size. Accordingly, by compressing the image data with compression unit 20, the cost and size of frame buffer 22 may be reduced compared to examples where no compression is applied.

Frame buffer 22 may not be needed in every example. As illustrated in FIG. 1C, neither devoce 12 nor panel devoce 16 includes frame buffer 22. In this example, device 12 and panel devoce 16 may not temporarily store the image data in frame buffer 22. However, even in these examples, it may be beneficial to compress the image data to promote bandwidth efficiency. For instance, keeping with the previous examples, without compression unit 20, devoce 12 may need to transmit 24,576,000 bits (assuming 1280×800 pixel values for an image frame composed by image processor 14). With compression of 50%, by compression unit 20, devoce 12 may need to transmit 12,288,000 bits which allows devoce 12 to transmit fewer bits per second for better bandwidth efficiency.

In this manner, in system 10A of FIG. 1A, although devoce 12 may transmit uncompressed image data to panel devoce 16, compression unit 20 may allow for a reduction in the size of frame buffer 22, thereby reducing the overall cost and real estate used by frame buffer 22 as compared to no compression. In system 10B of FIG. 1B, because compression unit 20 compresses the image data prior to transmission, devoce 12 may consume less bandwidth and the size and cost of frame buffer 22 in panel devoce 16 may be reduced as compared to no compression. In system 10C of FIG. 1C, with compression unit 20, bandwidth consumption may be reduced as compared to no compression. In system 10D of FIG. 1D, compression unit 20 may allow for a reduction in size and cost of frame buffer 22 as compared to no compression.

In the examples of FIGS. 1A-1D, decompression unit 24 may decompress the compressed image to reconstruct image data that is substantially similar to the original image data. For example, the output of decompression unit 24 may be pixel values that are substantially similar to the pixel values of the image frame that image processor 14 composed. In FIGS. 1A, 1B, and 1D, decompression unit 24 may receive the compressed image data from frame buffer 22, and in FIG. 1C, decompression unit 24 may receive the compressed image data from devoce 12 without prior storage in frame buffer 22.

To decompress the compressed image data, decompression unit 24 may apply the inverse of the compression that compression unit 20 applied. As described in more detail, in some examples, compression unit 20 may indicate the manner in which compression unit 20 compressed the image data, which allows decompression unit 24 to determine the manner in which to decompress the compressed image data. Also, as described in more detail, compression unit 20 may apply lossless or lossy compression. With lossless compression, decompression unit 24 may be able to decompress the compressed image data such that the resulting image data is virtually identical to the original image data. With lossy compression, decompression unit 24 may not be able to decompress the compressed image data such that the resulting image data is identical to the original image data. However, even with lossy compression, the decompressed image data may be similar, and potentially substantially similar, to the original image data.

Panel 26 may be any type of display. For instance, examples of panel 26 include, but are not limited to, a liquid crystal display (LCD), an organic light emitting diode display (OLED), a cathode ray tube (CRT) display, a plasma display, or another type of display device. Panel 26 may include a plurality of pixels that panel 26 illuminates to display the viewable content of the image frame composed by image processor 14. For example, the pixel values outputted by decompression unit 24 may indicate the manner in which the pixels of panel 26 are to be illuminated.

Although not shown in FIGS. 1A-1D, in some examples, decompression unit 24 may be coupled to a display processor, and the display processor may be coupled panel 26. In these examples, the display processor may determine the voltage that is to be applied to the pixels of panel 26 so that, when illuminated, the pixels present the desired color. In the examples of FIGS. 1A, 1B, and 1C, the components of panel devoce 16, excluding panel 26, may be considered as a driver for panel 26. For example, if panel 26 is a liquid crystal monitor, the driver may be referred to as an LCM driver that includes the illustrated components of panel devoce 16, and a display processor, and excludes panel 26.

To compress the image data, compression unit 20 may implement a budget-based compression scheme on blocks of the image data. As an example, one block of image data may be eight pixel values; however, aspects of this disclosure are not so limited. Compression unit 20 may continuously update a bit budget after compressing a block of image data that indicates how many bits are available to achieve the desired compression.

Compression unit 20 may determine an initial bit budget, as described in more detail below. Compression unit 20 may then determine a current bit budget for a current block based on the initial bit budget. In some examples, compression unit 20 may then implement various compression techniques including lossy and lossless compression. For example, compression unit 20 may implement a lossy compression technique to generate a lossy compressed image data block, and may implement a lossless compression technique to generate a lossless compressed image data block. Examples of the lossy and lossless compression techniques are described in more detail below. However, compression unit 20 may utilize any known or yet to be developed lossy or lossless compression technique, and aspects of this disclosure are not limited to specific lossy and lossless compression techniques described below.

Compression unit 20 may determine the number of bits in each of the lossy compressed image data block and the lossless compressed image data block. If the number of bits in the lossless compressed image data block is less than or equal to the current bit budget, compression unit 20 may store the bits of the lossless compressed image data block in frame buffer 22, or devoce 12 may transmit the bits of the lossless compressed image data block to panel devoce 16 (as appropriate in the examples of FIGS. 1A-1D). Otherwise, compression unit 20 may store the bits of the lossy compressed image data block in frame buffer 22, or devoce 12 may transmit the bits of the lossy compressed image data block to panel devoce 16 (as appropriate in the examples of FIGS. 1A-1D).

In some other examples, prior to compression, compression unit 20 may determine which type of compression should be utilized. For example, there may be various types of lossless and lossy compression techniques. Compression unit 20 may determine which type lossless or lossy compression techniques to utilize so that the compressed image data is within the current bit budget. Compression unit 20 may then compress the image data based on the determined compression technique.

In general, compression unit 20 may be biased towards selecting the results of lossless compression over lossy compression for storage or transmission. Lossless compression may maintain image quality when decompressed because it may be possible to fully reconstruct the original image data, while lossy compression may slightly degrade image quality when decompressed because it may not be possible to fully reconstruct the original image data. Rather, the decompressed image data, when compressed using lossy compression techniques, may be similar, but not identical, to the original image data.

In some examples, if both lossless compression and lossy compression results in compressed image data blocks that are within the current bit budget, then compression unit 20 may be biased towards selecting the lossless compressed image data block for storage or transmission because lossless compressed image data block may maintain image quality over lossy compressed image data block. Furthermore, as described below, compression unit 20 may implement lossy compression in such a manner that number of bits in the lossy compressed image block are guaranteed to be less than or equal to the current bit budget. Therefore, if the lossless compressed image block is greater than the bit budget, compression unit 20 may be able to output the lossy compressed image block because lossy compressed image block is compressed in such a manner that the number of bits in the lossy compressed image block is guaranteed to be less than or equal to the bit budget.

In accordance with techniques described in this disclosure, compression unit 20 may then determine the bit budget for the next image data block based on the current bit budget and an average number of extra bits per block. The average number of extra bits per block is described in more detail below. Compression unit 20 may reset the current budget to the determined budget of the next block. Compression unit 20 may repeat the above steps until the compression of the last block.

As describe above, in some examples, compression unit 20 may compress the image data of a composed image frame. The term "composed image frame" refers to a final composed image frame such as a final composed image that is ready for display. The term "composed image frame" is used to distinguish image frames that are in the process of being composed. For instance, as described above, image processor 14 may be a video decoder. A video decoder may construct an image frame from portions of various other reference frames (e.g., in a process referred to as inter-prediction), or portions within the image frame itself (e.g., in a process referred to as intra-prediction). Compression unit 20 may implement the compression techniques on the final composed image frame that the video decoder constructed, and not necessarily on the image frame while it is being constructed by the video decoder.

In some examples, compression unit 20 may achieve true real time compression. For example, compression unit 20 may be able to compress the image data in a single pass, rather than requiring multiple passes. In other words, as soon as compression unit 20 compresses an image data block, the bits of the compressed image data block may be transmitted or stored immediately. In this way, the addition of compression unit 20 and decompression unit 24 may increase latency (potentially only a slight increase in latency); however, no other modification to systems 10A-10D may be needed to achieve the reduction in size and cost of frame buffer 22 and/or reduction in bandwidth consumption.

Furthermore, as will be seen from the examples described below, compression unit 20 may not require large blocks of memory for compression. For instance, as described above, with compression unit 20, it may be possible to reduce the size of frame buffer 22. In some examples, compression unit 20 may implement compression techniques that do not require extensive memory for storage so that the compression techniques do not negate any reduction in size of frame buffer 22 achieved by compression unit 20.

Also, as will be seen from the examples described below, compression unit 20 may not require additional bandwidth for purposes of compression. For instance, as described above, with compression unit 20, it may be possible to reduce the bandwidth consumption. In some examples, compression unit 20 may implement compression techniques that do not require additional bandwidth, such as if temporal prediction (e.g., inter-prediction) is used for compression, so that the compression techniques do not negate any reduction in bandwidth consumption achieved by compression unit 20. For example, each image frame may be individually compressed without the need to refer to other image frames.

Figure 2:
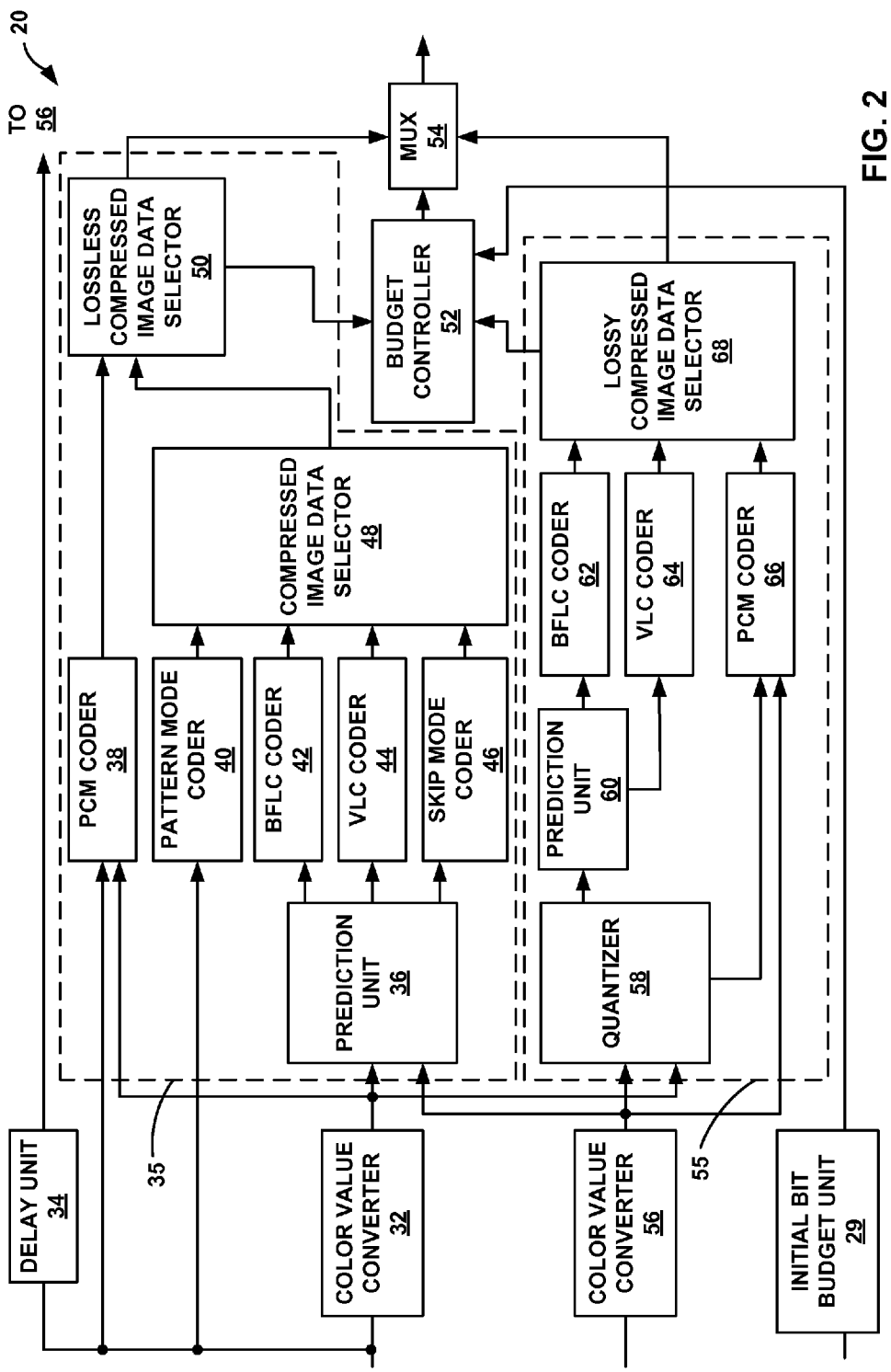
FIG. 2 is a block diagram illustrating an example of a compression unit of FIGS. 1A-1D in greater detail.

FIG. 2 is a block diagram illustrating an example of a compression unit of FIGS. 1A-1D in greater detail. For example, FIG. 2 illustrates compression unit 20 in greater detail. Examples of compression unit 20 include, but are not limited to, any of a variety or general purpose or special purpose processing hardware, such as a digital signal processor (DSP), a general purpose microprocessor, application specific integrated circuit (ASIC), field programmable logic array (FPGA), or other equivalent integrated or discrete logic circuitry.

Compression unit 20 may implement a plurality of different compression techniques, in parallel (e.g., at the same time), on the image data. Compression unit 20 may select the compressed image data compressed in accordance with one of the different compression techniques based on the current bit budget. In this manner, in some examples, compression unit 20 may not perform any a-priori decision as to which particular compression technique should be utilized. In these examples, if more than one compression technique results in compressed image data that is within the current bit budget, compression unit 20 may select the compressed image data with the least number of bits from among the compressed image data generated by the different compression techniques.

Figure 18:
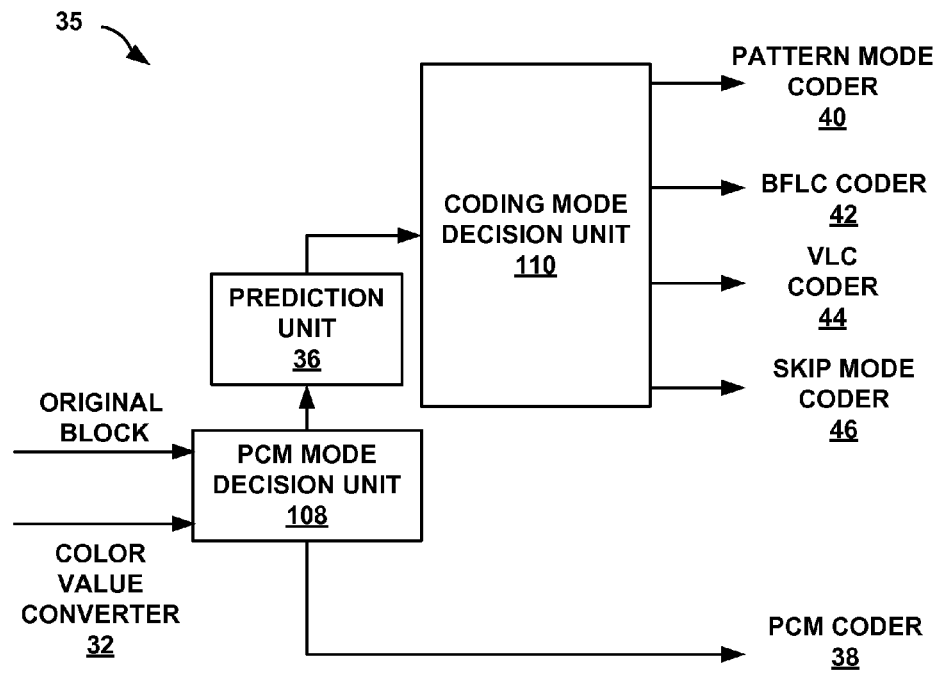
FIG. 18 is a block diagram illustrating an example of a lossless compression unit.
Figure 19:
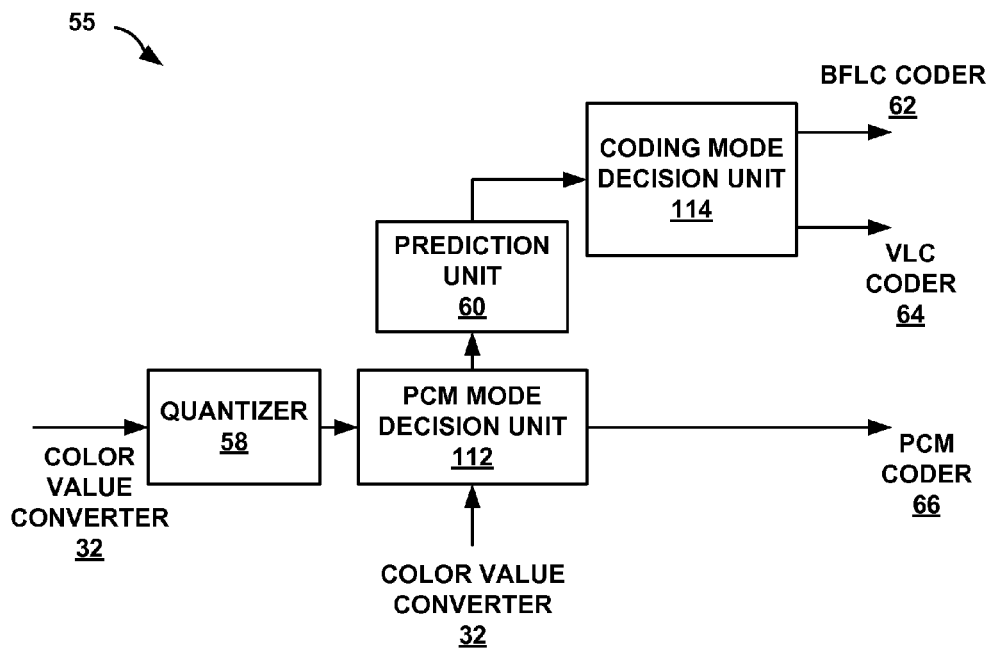
FIG. 19 is a block diagram illustrating an example of a lossy compression unit.

Furthermore, FIGS. 18 and 19 illustrate examples where compression unit 20 may determine a-priori which type of compression technique to apply. For example, compression unit 20 may determine which type of compression technique to apply prior to compression, and may compress in accordance with the determined type of compression technique. For succinctness, some of the description of FIG. 2 explicitly refers to the example illustrated in FIGS. 18 and 19. Therefore, in describing FIG. 2, this disclosure describes examples in which compression unit 20 implements the different compression techniques in parallel (i.e., at a same time), and selects the compressed image data from one of the compression techniques, and examples in which compression unit 20 may determine which type of compression to apply, and select the compression image data compressed in accordance with the determine type of compression.

As illustrated, compression unit 20 includes initial bit budget unit 29, color value converter 32, color value converter 56, lossless compression unit 35, lossy compression unit 55, delay unit 34, budget controller 52, and multiplexer (MUX) 54. Compression unit 20 may not include all of these components in every example.

For example, as described in more detail, initial bit budget unit 29 may determine an initial bit budget for compressing image data. In some example, compression unit 20 may not include initial bit budget unit 29, and may instead receive the initial bit budget for compressing the image data from another component such as a processor of devoce 12. In these examples, compression unit 20 may not include initial bit budget unit 29.

As another example, color value converter 32 and color value converter 56 may provide some pre-compression of the image data. Such pre-compression may not be necessary in every example, and compression unit 20 may not include color value converter 32 and color value converter 56 in such examples.

As another example, compression unit 20 may perform only lossless compression or perform only lossy compression. In examples where compression unit 20 is configured to perform only lossy compression, compression unit 20 may not include lossy compression unit 55. In examples where compression unit 20 is configured to perform only lossy compression, compression unit may not include lossless compression unit 35. As yet another example, as described in more detail, compression unit 20 may not include all of the components of lossless compression unit 35 and lossy compression unit 55 that are illustrated in the example of FIG. 2.

Accordingly, FIG. 2 illustrates one example of compression unit 20. In general, compression unit 20 may include any components that allow compression unit 20 to compress the image data to meet the current bit budget for a block of image data. For example, in aspects described in this disclosure, compression unit 20 may utilize any known or yet to be developed technique to compresses the image data, and FIG. 2 illustrates some example techniques that compression unit 20 may implement to compress the image data.

Initial bit budget unit 29 may determine the initial bit budget for the composed image frame. The initial bit budget for the composed image frame may be an initial bit budget that allows compression unit 20 to achieve a target compression. The target compression may be user programmable or pre-programmed. For example, initial bit budget unit 29 may receive the user-selected or preprogrammed target compression value from another component such as image processor 14 of devoce 12, or another processor, such as the central processing unit (CPU), of devoce 12.

The target compression indicates a ratio between the number of bits in the compressed image data and the number of bits in the image data. As one example, a user may select a target compression of 50%, which may mean that the number of bits in the compressed image data for the image frame is half the number of bits in the original image data.

Compressing the image data by more than 50%, which means a target compression value of less than 50%, may be undesirable because the degradation in image quality of the image frame may be too large. For example, a target compression value of 30% may mean that the ratio between the number of bits in the compressed image data and the original image data is 0.30. Such amounts of compression may negatively impact image quality. In some examples, the target compression value may be $k/24$, where $8 \leq k < 24$. However, a value of k less than 12 may degrade the image quality of the composed image frame such that, after decompression, the resulting image quality is less than desirable. Furthermore, although compressing by more than 50% may degrade image quality more than desirable, it may be possible for the target compression to be less than 50%, and even less than $k/24$, where k equals 8.

There may be various ways in which compression unit 20 may achieve the target compression for the composed image frame, and initial bit budget unit 29 may determine the initial bit budget for any of these various ways. For instance, assume that the target compression value is 50%. As one example, to compress the image data of image frame by 50%, initial bit budget unit 29 may determine the initial bit budget for a line of the image frame, such that if the image data for that line were to be compressed, the total number of bits in the compressed image data for that line would be 50% of the total number of bits in the original image data for that line. In this example, if each line of the image frame were compressed by 50%, then the resulting compressed image data for the image frame would be 50% of the original image data.

As another example, to compress the image data of the composed image frame, initial bit budget unit 29 may determine the initial budget for the entire image frame. For example, assume the target compression is 50% for the entire image frame. In this example, initial bit budget unit 29 may determine the initial bit budget for the entire image frame such that when the image data for the entire image frame is compressed, the total number of bits in the compressed image data for the image frame would be 50% of the total number of bits in the original image data.

As yet another example, to compress the image data for the composed image frame, initial bit budget unit 20 may determine the initial budget for a slice of the composed image frame, where a slice includes a plurality of lines, and the image frame includes one or more slices. Again, if the target compression is 50% for the entire image frame, initial bit budget unit 29 may determine the initial budget for a slice such that when the image data for the slice is compressed the compressed image data is 50% of the image data for that slice. In this example, if each slice of the image frame were compressed by 50%, then the resulting compressed image data for the image frame would be 50% of the original image data.

In some instances, it may be more desirable to utilize the initial bit budget for the entire image frame for purposes of compression, as compared to the initial bit budget for a line or a slice of the image frame. For instance, some lines or slices of the image frame may be relatively complex (e.g., difficult to compress by 50% while maintaining high quality) compared to less complex lines or slices (e.g., lines or slices that can be compressed by more than 50% while maintaining high quality).

By determining the initial bit budget for the entire image frame, compression 20 may perform lesser compression of complex lines or slices to maintain quality and greater compression of simple lines or slices that can be compressed more while maintaining quality. However, determining the initial bit budget for each line or for each slice may force compression unit 20 to compress the image data by the same amount for each line or slice. This may result in degradation of image quality of the complex lines and slices and less compression than possible for the simple lines or slices.

Accordingly, the techniques of this disclosure are first described in the context of where the initial bit budget is determined for the entire image frame rather than for a line or slice. Utilizing an initial bit budget for each line or slice for purposes of compression is described subsequently.

The initial bit budget for the composed image frame may be based on a number of blocks within the image frame and an average number of extra bits per block. The average number of extra bits per block may be based on a compressed bit threshold value, and the compressed bit threshold value may be based on the target compression. In this way, initial bit budget unit 29 may determine the initial bit budget for the entire image frame based on the target compression. The "number of blocks within the image frame," "the average number of extra bits per block," and "the compressed bit threshold value" are all described in greater detail below.

The image frame may be divided into a plurality of blocks that each includes a plurality of pixels. As an illustrative example, one block of the image frame may include eight pixels (e.g., 1×8 block of pixels); however, aspects of this disclosure are not limited to a block of the image frame including eight pixels, and a block of the image frame may include more or fewer than eight pixels, and may even be a two-dimensional block of pixels. Also, assume that the size of the image frame is 1280×800 pixels, which is again an illustrative value and should not be considered limiting. In this example, the number of blocks within the image frame may equal 1280×800 pixels divided by 8 pixels per block, which is 128,000 blocks.

For instance, in this example, initial bit budget unit 29 may be preprogrammed with the block size of eight, or may receive the block size value from some other component such as image processor 14 or some other processor of devoce 12. Also, initial bit budget unit 29 may be preprogrammed with the size of the image frame or may receive the size of the image frame (e.g., 1280×800 pixels). Initial bit budget unit 29 may then determine the number of blocks in the image frame based on the image frame size and the block size.

The compressed bit threshold value may define the number of bits that are guaranteed to be available for compressing a block, and may denote the number of bits assigned for each block. For example, the compressed bit threshold value indicates a number of bits that are guaranteed available for each of the blocks of the image frame for compression. In other words, in accordance with the budget-based scheme described in this disclosure, each block of the image frame can be compressed, and can be compressed down to at least the guaranteed number of bits that are available for each block, as defined by compressed bit threshold value.

The compressed bit threshold value may be user defined or preprogrammed. For example, initial bit budget unit 29 may receive the compressed bit threshold value from image processor 14 or another processor of devoce 12, or may be preprogrammed with the compressed bit threshold value.

The compressed bit threshold value may be a value less than or equal to an average number of compressed bits per block. The average number of compressed bits per block indicates an average number of bits per block to achieve the target compression, and may denote the budget for each block. For example, if the target compression is 50%, the average number of bits per block may be equal to the number of bits per block resulting in a block being compressed by 50%.

As one example, assume that there are 24 bits per pixel (e.g., 8 bits for each one of red, green, and blue components), and there are 8 pixels per block. Then the total number of bits for the 8 pixels is 192 bits (i.e., 24 multiplied by 8). If the target compression for the entire composed image frame is 50%, then the average number of compressed bits per block is 96 bits (i.e., 192 bits multiplied by 0.5). In this way, if the entire image frame is compressed by 50%, then, on average, each image frame block was compressed by 50%.

It should be understood that the average number of compressed bits per block is not a measure how much each block must be compressed. For example, compression unit 20 may compress a current block of the image frame by more than average number of compressed bits per block, equal to the average number of compressed bits per block, or less than the average number of compressed bits per block. In instances where compression unit 20 compresses one block by less than the average number of compressed bits per block, there would be some other block that compression unit 20 compresses by more than the average number of compressed bits per block so that, on average, the number of bits in a compressed block is equal to the average number of compressed bits per block.

As an example of the relationship between the average number of compressed bits per block and the compressed bit threshold value, if the average number of compressed bits per block is 96 bits, then the compressed bit threshold value may be 92 bits because 92 bits is less than 96 bits. In this example, compression unit 20 is guaranteed to have at least 92 bits available for compressing a block. In other words, for any 192 bits in an original image frame block, the compressed bit threshold value of 92 means that the 192 bits in the original image frame block can always be compressed to 92 bits, because it is guaranteed that 92 bits are available for compressing the 192 bits of the original image data. However, it is not necessary that the original image data is compressed to 92 bits. Rather, compression unit 20 may compress the original image data by less than 92 bits, equal to 92 bits, or greater than 92 bits, where 92 bits is the compressed bit threshold value.

In general, the compressed bit threshold value may not deviate substantially from the average number of compressed bits per block. For instance, in this example, the compressed bit threshold may be in the range of 90 bits to 96 bits, assuming 24 bits per pixel and 8 pixels per block.

Setting the compressed bit threshold value too low (e.g., less than 90 bits) may result in undesirable degradation in image quality. For instance, as described above, the compressed bit threshold value indicates a number of bits that are guaranteed available for each of the blocks for compression. If the guaranteed number of bits were too low, then some blocks may be compressed to a point where the image quality degrades. Accordingly, a compressed bit threshold value that is close to the average number of compressed bits per block may ensure that proper image quality is maintained.

The average number of compressed bits per block minus the compressed bit threshold value may indicate an average number of extra bits per block. For example, since the compressed bit threshold value indicates the number of bits that are guaranteed available for each block for compression and the average number of compressed bits per block indicates the average number of bits in a compressed block, the average number of extra bits per block indicates an average value of additional bits that compression unit 20 may use to compress an image frame block. In the example above, the average number of extra bits per block is equal to 4 (i.e., average number of compressed bits per block (96) minus compressed bit threshold value (92) equals 4).

The average extra bits per block may be helpful for image frames that include complex blocks at the beginning, and less complex blocks at the end. For example, assume that compression unit 20 begins compression starting from the top-left block of the image frame and continuing to the bottom-right block of the image frame. In this example, the average extra bits per block may be seen as compression unit 20 borrowing bits from the less complex blocks for the compression of the more complex blocks. Even in examples where the initial blocks are less complex than later blocks, the average extra bits per block may be beneficial as being left over bits that can be used for compressing the later more complex blocks.

As a simple example to assist with understanding, assume that the image frame includes two 8 pixel blocks, where each pixel is 24 bits, for a total of 192 bits per block (i.e., 8 pixels per block multiplied by 24 bits per pixel equals 192 bits per block). Also, assume that the target compression is 50%, which means that the average number of compressed bits per block is 96, and assume that the compressed bit threshold value is 92 bits. In this example, the original image frame includes 386 bits (i.e., 192 bits per block multiplied by 2 blocks). With 50% compression, the resulting number of compressed bits should be 192 bits (i.e., 384 multiplied by 0.5).

Also, assume that the first block is less complex image data as compared to the second block. In this example, compression unit 20 may be able to compress the 192 bits of the first block to 90 bits. Therefore, there are 102 bits left over for compression unit 20 to compress the second block (i.e., 192 bits minus 90 bits equals 102 bits). In this example, compression unit 20 may be considered as borrowing 6 bits from the number of bits needed to compress the first block for compressing the second block to achieve 50% overall compression, which allows compression unit 20 a bit budget of 102 bits for the second block.

In other words, in the previous example, compression unit 20 may have compressed both the first and second blocks to 96 bits. However, due to the lower complexity of the first block, compression unit 20 utilized only 90 bits for compression. This allowed compression unit 20 to utilize the 6 bits that compression unit 20 could have used to compress the first block for compressing the second block. Therefore, compression unit 20 can utilize 102 bits to compress the 192 bits of image data of the second block, rather than 96 bits.

The preceding examples describe one way in which initial bit budget unit 29 may determine the average number of extra bits per block. However, aspects of this disclosure are not so limited. In other examples, rather than determining the average number of extra bits per block, initial bit budget unit 29 may receive the value of the average number of extra bits per block, or initial bit budget unit 29 may be preprogrammed with the value of the average number of extra bits per block. Accordingly, although it may be possible for initial bit budget unit 29 to determine the initial bit budget based on the average number of extra bits per block, it may not be necessary for initial bit budget unit 29 to determine the average number of extra bits per block, in every example. Rather, initial bit budget 29 may receive the value of the average number of extra bits per block, or may be preprogrammed with the value of the average number of extra bits per block. In alternate examples, initial bit budget unit 29 may determine the average number of extra bits per block in the above described manner.

To determine the initial bit budget, initial bit budget unit 29 may multiply the average number of extra bits per block by the total number of blocks. For example, if the total number of blocks in the image frame is 128,000 (e.g., 1280×800 pixels divided by 8 pixels per block), then the initial bit budget is 512,000 (e.g., 128,000 multiplied by 4).

It should be understood that in some examples, one or more of "the average number of extra bits per block," "the average number of compressed bits per block," "the compressed bit threshold value," and "the initial bit budget" may all be predetermined for all image frames. For example, image processor 14 or some other processor of devoce 12 may predetermine some or all of these values, and initial bit budget unit 29 may be part of image processor 14 or the some other processor of device 12. In another example, some or all of the values may be stored in memory of device 12, and compression unit 20 may be able to retrieve one or more of these values from the memory of devoce 12.

As described in more detail, compression unit 20 may determine the current bit budget for the first block of the image frame based on the initial bit budget and the compressed bit threshold value. For subsequent blocks of the image frame, compression unit 20 may determine the current bit budget based on the previous bit budget, the number of bits of a previous compressed block, and the compressed bit threshold value that indicates a number of bits that are guaranteed available for each of the blocks of the image frame for compression.

In the example illustrated in FIG. 2, budget controller 52 may receive the initial bit budget and determine a current bit budget for the first image frame block from the initial bit budget. The current bit budget for the first block (e.g., block 0) may be the initial bit budget plus the compressed bit threshold value. In the example above, the initial bit budget is 512,000 plus 92, which equals 512,092 bits.

Lossless compression unit 35 and lossy compression unit 55 may each compress the first block utilizing lossless and lossy compression techniques, respectively, as described below in more detail. For example, lossless compression unit 35 may generate a lossless compressed image frame block, which is the original block compressed using lossless compression techniques, and lossy compression unit 55 may generate a lossy compressed image frame block, which is the original block compressed using lossy compression techniques.

Lossless compression unit 35 may output a value to budget controller 52 that indicates the number of bits in the lossless compressed image frame block. Similarly, lossy compression unit 55 may output a value to budget controller 52 that indicates the number of bits in the lossy compressed image frame block. Budget controller 52 may determine which one of the lossless compressed image frame block and the lossy compressed image frame block is within the current bit budget, and select the compressed image frame block that is within the current budget for MUX 54 to output. For example, budget controller 52 may output an indication to MUX 54 that indicates to MUX 54 to output the selected compressed image frame block. MUX 54 may output the selected compressed image frame block to frame buffer 22 or decompression unit 24, as described above with respect to FIGS. 1A-1D.

In some instances, it may be possible that both the number of bits of the lossless compressed image frame block and the number of bits of the lossy compressed image frame block is within the current bit budget. In some examples, in such instances, budget controller 52 may indicate to MUX 54 to output the lossless compressed image frame block instead of the lossy compressed image frame block. In general, when decompression unit 24 decompresses the lossless compressed image frame block, the resulting decompressed bits may be identical to the original bits of the image frame block. However, when decompression unit 24 decompresses the lossy compressed image frame block, the resulting decompressed bits may not be identical to the original bits of the image frame block.

Because the decompressed bits of the lossy compressed image frame block are not identical to the original bits of the image frame block, there may be some degradation in the image quality when the decompressed bits of the lossy compressed image frame block are used to illuminate the pixels of panel 26. To avoid the degradation in the image quality, budget controller 52 may be biased towards selecting the output of lossless compression unit 35 over lossy compression unit 55 when the outputs of both are within the current bit budget.

For example, in the previous example, budget controller 52 may determine that the current bit budget for image frame block 0 is 512,092 bits. Assume that lossless compression unit 35 compresses the 192 bits of block 0 to 108 bits, and lossy compression unit 55 compresses the 192 bits of block 0 to 98 bits. In this example, both 108 bits and 98 bits are less than 512,092 bits. Therefore, the compressed image frame block outputs of both lossless compression unit 35 and lossy compression unit 55 are within the current bit budget of 512,092. In this example, budget controller 52 may select the output of lossless compression unit 35, due to the bias towards lossless compression, and cause MUX 54 to output the lossless compressed image frame block.

If, however, the number of bits of the lossy compressed image frame block is less than the current bit budget, and the number of bits of the lossless compressed image frame block is greater than the current bit budget, then budget controller 52 may select the output of lossy compression unit 55, and indicate to MUX 54 to output the lossy compressed image frame block. In some examples, lossy compression unit 55 may implement lossy compression such that the number of bits in the lossy compressed image frame block is guaranteed to be less than or equal to the current bit budget. In this manner, if lossless compression and lossy compression both meet the current bit budget, MUX 54 may select the lossless compression image frame block. However, if the lossless compression image frame block does not meet the current bit budget, then the lossy compression image frame block is guaranteed to meet the current bit budget.

Budget controller 52 may then determine the current bit budget for the next image frame block (e.g., block 1). To determine the current bit budget for the next block, budget controller 52 may subtract the number of bits of the previous compressed block (e.g., block 0) from the budget of the previous block. For instance, the bit budget for the previous block (e.g., block 0) was 512,092 bits, and budget controller 52 selected the output lossless compressed image frame block outputted by lossless compression unit 35 that utilized 108 bits (e.g., the number of bits of the previous compressed block).

In this example, budget controller 52 may subtract 108 bits from 512,092 bits which equals 511,984 bits. Budget controller 52 may sum the resulting value (e.g., 511,984 bits) with the compressed bit threshold value (e.g., 92). The resulting value from the summation may be the current bit budget for the current block. For instance, in this example, the current bit budget for image frame block 1 is 512,076 bits (i.e., 511,984 plus 92). Lossless compression unit 35 and lossy compression unit 55 may compress block 1, and budget controller 52 may repeat the above steps to determine whether to output the lossless or lossy compressed image frame block for block 1, and repeat similar steps for all subsequent blocks within the image frame.

In the above example, prior to compression of the current block, the current bit budget for the block may be considered as current bit budget+=compressed bit threshold value, and after compression of the current block, the current bit budget may be considered as current bit budget−=bits spent in compressing the current block. In other words, the equation for the current bit budget may be represented as current bit budget+=compressed bit threshold value−compressed bits of previous block. In this manner, so long as the current bit budget is greater than or equal to 0, compression unit 20 may guarantee that the size of the image frame after compression is within budget (e.g., 50% of the original assuming a 50% target compression).

In some examples, it may be possible to predict the values of pixels in lines from values of preceding pixels within the line as described in more detail with respect to prediction unit 36 and prediction unit 60. However, for the first block in a line, there may be no previous pixels from which to predict the values. To address this, in some examples, budget controller 52 may slightly modify the initial bit budget and/or the compressed bit threshold value for the first blocks within a line.

For example, if the compressed bit threshold value is 92 bits, for the first block within each of the lines, budget controller 52 may assign the compressed bit threshold value, for these blocks, to be 94 bits. Because the compressed bit threshold value is added to the previous bit budget for the previous block, an increase in the compressed bit threshold value for the first block within each of the line results in a slightly greater bit budget for those first blocks. Budget controller 52 may similarly modify the initial bit budget so that budget controller 52 may be able to assign a slightly higher bit budget to a first block of a line as compared to other blocks within the line.

Modifying the bit budget for the first block within each line may not be necessary in every example. For instance, in some examples, compression unit 20 may not perform prediction such as the prediction performed by prediction unit 36 and prediction unit 60, and in these examples, budget controller 52 may not modify the bit budget for the first block of each line. Furthermore, even in examples where compression unit 20 performs prediction, budget controller 52 may not modify the bit budget for the first block within each line.

In the previous examples, budget controller 52 utilized the initial bit budget for the entire image frame to determine the current bit budget for each block. The following describes examples where budget controller 52 may utilize the initial bit budget for each line or for each slice to determine the current bit budget for each block.

For instance, in the previous example, the initial bit budget equaled the average number of extra bits per block multiplied by the total number of blocks in the image frame. The initial bit budget for a line may be the average number of extra bits per block multiplied by the total number of blocks in the line. The initial bit budget for a slice may be the average number of extra bits per block multiplied by the total number of blocks in the slice.

For example, assume that the size of the image frame is 1280×800. Therefore, there are 1280 pixels in a line. If the block size is 8 pixels, then there are 160 blocks in a line (i.e., 1280 divided by 8). In this example, the initial bit budget for a line is 160 blocks multiplied by 4 (e.g., the average number of extra bits per block), which is 640 bits.

For a slice, the total number of blocks in that slice is based on the number of lines within the slice. For example, assume that a slice includes 16 lines, which means that, in this example, the size of the slice is 1280×16. If the block size is 8 pixels, then there are 2560 blocks per slice, and the initial bit budget for a slice is 2560 blocks per slice multiplied by 4 (e.g., the average number of extra bits per slice), which is 10,240 bits.

For the example where the initial bit budget is for a line, budget controller 52 may determine the current bit budget for the first block to be the initial bit budget for the line plus the compressed bit threshold value. For the example where the initial bit budget is for a slice, budget controller 52 may determine the current bit budget for the first block to be the initial bit budget for the slice plus the compressed bit threshold value.

Lossless compression unit 35 and lossy compression unit 55 may compress the first block of the line or slice, as described above, and budget controller 52 may select either the resulting lossless compressed block or lossy compressed block for output by MUX 54. Then budget controller 52 may determine the current bit budget for the second block as described above (e.g., current bit budget equals previous bit budget plus the compressed bit threshold value minus number of bits of the previous compressed block). However, budget controller 52 may reset the bit budget for each line, in examples where the initial bit budget is for a line, and reset the bit budget for each slice, in examples where the initial bit budget is for a slice.

As illustrated, compression unit 20 may include color value converter 32. Color value converter 32 may receive a block of the image frame, and provide some lossless pre-compression. For example, color value converter 32 may convert the color values to a different color space. As described above, image processor 14 may define the color values as RGB components, where each component is 8 bits. Color value converter 32 may convert the color values for the pixels from the RGB color space to the luma and chroma color space.

As one example, color value converter 32 may convert the RGB values to YCoCg values, where Y is the luma component and Co and Cg are the chroma components. For example, the "Y" represents luminance or intensity, "Co" represents orange chrominance, and "Cg" represents green chrominance. Converting the RGB values to YCoCg values is one example, and converting to other color spaces may be possible such as YCbCr, where "Cb" represents blue chrominance, and "Cr" represents red chrominance, HSV, where "H" represents hue, "S" represents saturation, and "V" represents value or intensity, or any other color space.

For the color space conversion from RGB to YCoCg, color value converter 32 may implement the following matrix operation:

$$\begin{bmatrix} Y \\ Co \\ Cg \end{bmatrix} = \begin{bmatrix} 1/4 & 1/2 & 1/4 \\ 1/2 & 0 & 1/2 \\ -1/4 & 1/2 & -1/4 \end{bmatrix} * \begin{bmatrix} R \\ G \\ B \end{bmatrix}$$

In this example, color value converter 32 may implement the above matrix operation utilizing "+" and "shifts." This may allow color value converter 32 to perform the matrix operations relatively quickly and without the need for multiplication or division.

By converting the pixel values from RGB color space to YCoCg color space, color value converter 32 may reduce the number of bits that are needed to represent the color values, in some examples. For example, in the RGB color space, each color value may be 24 bits. In YCoCg color space, color value converter 32 may utilize 8 bits for the Y component and 9 bits for the Co and Cg components, for a total of 17 bits. However, color value converters 32 may not reduce the 24 bits to 17 bits in every example. Furthermore, conversion of the color space may be considered lossless conversion, allowing decompression unit 24 to reconstruct the original RGB color values.

For example, decompression unit 24 may implement the following matrix operation to convert the YCoCg values into RGB values.

$$\begin{bmatrix} R \\ G \\ B \end{bmatrix} = \begin{bmatrix} 1 & 1 & -1 \\ 1 & 0 & 1 \\ 1 & -1 & -1 \end{bmatrix} * \begin{bmatrix} Y \\ Co \\ Cg \end{bmatrix}$$

Color value converter 32 may not be necessary in every example of compression unit 20. For example, the pre-compression provided by color value converter 32 may not be necessary in every example. As illustrated, color value converter 32 outputs the resulting color values to lossless compression unit 35 and lossy compression unit 55. In examples where compression unit 20 does not include color value converter 32, lossless compression unit 35 and lossy compression unit 55 may receive the color values without color space conversion.

Lossless compression unit 35 may include prediction unit 36. Similar to color value converter 32, prediction unit 36 may provide some additional pre-compression. The pre-compression provided by prediction unit 36 may not be necessary in every example, and compression unit 20 may not include prediction unit 36 in every example. For purposes of illustration and description, prediction unit 36 is illustrated as receiving the pre-compressed block of the image frame, as pre-compressed by color value converter 32. In other examples, prediction unit 36 may receive the original block of the image frame.

Prediction unit 36 may be configured to perform one-dimensional prediction (1D prediction) and/or two-dimensional prediction (2D prediction) on the block of the image frame. In 1D and 2D prediction, prediction unit 36 may predict the color value of a pixel within a block, and determine the prediction error value for the predicted color value. The prediction error value is the difference between the actual color value and the predicted color value. In some examples, the bits needed to represent the predicted color value and the prediction error value may be less than the bits needed to represent the color value in either the YCoCg color space or the RGB color space.

Figure 3A:
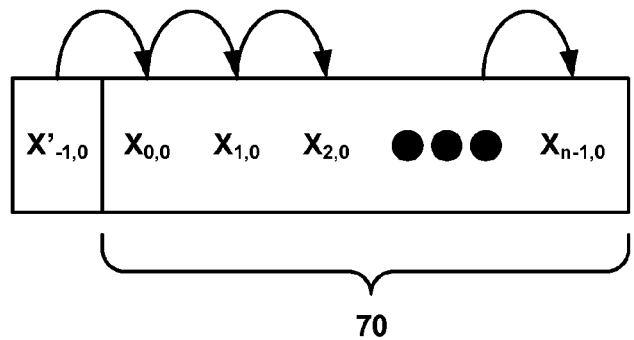
FIGS. 3A and 3B are conceptual diagrams that illustrate examples of one-dimensional prediction.
Figure 3B:
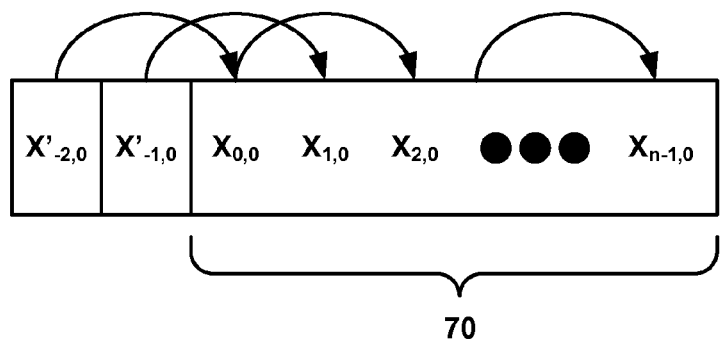

There may be two examples of 1D prediction: progressive prediction, and interleave prediction. FIGS. 3A and 3B are conceptual diagrams that illustrate examples of one-dimensional prediction. For example, FIG. 3A illustrates progressive prediction, and FIG. 3B illustrates interleave prediction. In progressive prediction, the color value for a pixel is predicted from the color value of its preceding pixel, as illustrated in FIG. 3A. In interleave prediction, the color value for a pixel is predicted from the color value of a pixel preceding the immediately preceding pixel, as illustrated in FIG. 3B.

For instance, FIGS. 3A and 3B illustrate block 70 that includes pixels $X_{i,j}$, where i and j are the x- and y-coordinates, respectively, of the pixel. For example, block 70 includes color values for pixels $X_{0,0}$ to $X_{n-1,0}$, where n equals 8. For progressive prediction, pixel $X_{i,0}$ is predicted from $X_{i-2,0}$, as illustrated in FIG. 3A. For interleave prediction, pixel $X_{i,0}$ is predicted from $X_{i-2,0}$, as illustrated in FIG. 3B.

With progressive prediction, to predict the color value of the first pixel in block 70, prediction unit 36 may require the color value of the last pixel in the previous block. For instance, in FIG. 3A, the pixel value for $X_{0,0}$ is predicted from the color value for $X'_{-1,0}$, where X' represents the color value of the last pixel that is reconstructed from its predicted color value and prediction error value. For example, prediction unit 30 may have previously predicted the color value of the pixel $X_{1,0}$. In this example, $X'_{-1,0}$ represents the reconstructed version of $X_{-1,0}$ based on the color value that was used to predict $X_{-1,0}$, and the prediction error value.

With interleave prediction, to predict the color values of the first and second pixels in the block 70, prediction unit 36 may require the color values of the last pixel and the penultimate pixel in the previous block. For instance, in FIG. 3B, the pixel value for $X_{0,0}$ is predicted from the color value for $X'_{-2,0}$, and $X_{1,0}$ is predicted from the color value for $X'_{-1,0}$.

To provide prediction unit 36 with color values for the previous block, compression unit 20 may include delay unit 34. As illustrated, delay unit 34 receives the original color values of the pixels within the block. Delay unit 34 may then output the color values of the pixels to color value converter 56. In this example, color value converter 56 may receive the output from delay unit 34 at approximately the same time that color value converter 32 receives the next block. In this manner, delay unit 34 may delay outputting the color values of the current block until color value converter 32 receives the color values of the block subsequent to the current block.

Delay unit 34 may implement any known technique or yet to be developed technique to delay the time when color value converter 56 receives the color values for the current block when color value converter 32 receives the color values for the next block. Furthermore, in some examples, delay unit 34 may not be necessary.

For instance, in some examples, image processor 14 may output the color values block by block into a buffer, different than the frame buffer. For example, the buffer may be ping-pong buffer. The ping-pong buffer may temporarily store the color values for the current block, and the color values for the previous block. Compression unit 20 may receive the color values for the current block and the previous block from the ping-pong buffer. For example, color value converter 32 may receive the color values for the current block from the ping-pong buffer, and color value converter 56 may receive the color values for the previous block from the ping-pong buffer.

Color value converter 56 may be substantially similar to color value converter 32, and may perform substantially similar functions. For instance, color value converter 56 may convert the color values of the previous block from the RGB color space to the YCoCg color space in a manner similar to that described above with respect to color value converter 32.

When performing 1D prediction, prediction unit 36 may determine whether to perform progressive prediction or interleave prediction. For example, if the following equation is true, prediction unit 36 may perform progressive prediction rather than interleave prediction. If false, prediction unit 36 may perform interleave prediction rather than progressive prediction.

$$\sum_{i=0}^{n-1} |X_{i,0} - X''_{i-1,0}| \le \sum_{i=0}^{n-1} |X_{i,0} - X''_{i-2,0}|,$$

where $X''_{i-1,0}$ equals $X_{i-1,0}$ when i>0, $X''_{i-1,0}$ equals $X'_{i-1,0}$ when i=0, and $X''_{i-2,0}$ equals $X_{i-2}$ when i>0, $X''_{i-2,0}$ when i=0.

For 1D prediction, the predicted color value for pixel $X_{i,j}$ is represented by $P_{i,j}$. For progressive prediction, $P_{i,0}$ equals $X''_{i-1,0}$, and for interleave prediction, $P_{i,0}$ equals $X''_{i-2,0}$, where $X''_{i-1,0}$ and $X''_{i-2,0}$ are defined above. The prediction error value for $P_{i,j}$ is $E_{i,j}$, and may represent the difference in the actual color value and the predicted color value. For example, $E_{i,0}$ equals $X_{i,0}$ minus $P_{i,0}$.

Figure 3C:
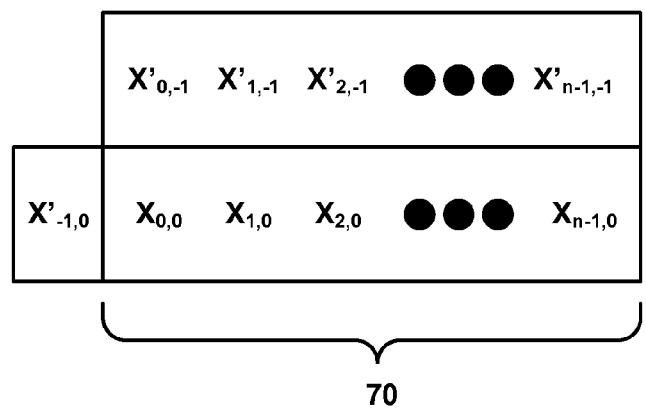
FIG. 3C is a conceptual diagram that illustrates one example of two-dimensional prediction.

In some examples, instead of or in addition to 1D prediction, prediction unit 36 may be configured to perform 2D prediction. In 2D prediction, prediction unit 36 may predict the color values from a neighboring block that is immediately above or below the current block. For example, if compression unit 20 is compressing image frame blocks from top to bottom, then the neighboring block may be immediately above the current block, and vice-versa if compression unit 20 is compressing image frame blocks from bottom to top. FIG. 3C is a conceptual diagram that illustrates one example of two-dimensional prediction.

To perform 2D prediction, prediction unit 36 may receive the neighboring block through color value converter 56. For example, image processor 14 may output the blocks to a ping-pong buffer, and color value converter 32 may receive the current block from the ping-pong buffer, and color value converter 56 may receive the neighboring block from the ping-pong buffer. As another example, delay unit 34 may receive the current block, and output the current block to color value converter 56 when color value converter 32 receives the block immediately below block. In this case, the block that color value converter 32 receives may be now considered as the current block, and the block outputted by delay unit 34 and received by color value converter 56 may be considered as the neighboring block.

As illustrated in FIG. 3C, for each pixel $X_{i,j}$ in block 70, there is a corresponding pixel in the neighboring block, which is the block immediately above block 70. In some examples, prediction unit 36 may predict the color value for pixel $X_{i,j}$ from $X'_{i,j-1}$. However, this may not be case in every example.

For instance, the 2D prediction may be considered as two-dimensional prediction because in some instances, prediction unit 36 may predict the color value in the vertical direction (e.g., from the neighboring block that is above block 70), and in some instances, prediction unit 36 may predict the color value in the horizontal direction (e.g., from a previous block in the same line).

For example, prediction unit 36 may determine whether the following equation is true. If true, prediction unit 36 may predict the color values from a neighboring block in the same line, and if false, prediction unit 36 may predict the color values from a neighboring block that is above or below the current block.

$$\sum_{i=0}^{n-1} |X_{i,0} - X''_{i-1,0}| \le \sum_{i=0}^{n-1} |X_{i,0} - X'_{i,-1}|,$$

where $X''_{i,1-0}$ is the same as above, and $X'_{i,-1}$ refers to the pixel that is immediately above the pixel $X_{i,0}$.

For instance, if the above equation is true, then prediction unit 36 may implement the progressive prediction technique described above utilizing a horizontal block (e.g., a neighboring block in the same line). In some examples, it may be possible for prediction unit 36 to perform the interleave prediction. For instance, prediction unit 36 may select predicting color values horizontally when $$\sum_{i=0}^{n-1} |X_{i,0} - X''_{i-1,0}| \le \sum_{i=0}^{n-1} |X_{i,0} - X'_{i,-1}|$$

is true. When true, prediction unit 36 may then select between progressive prediction or interleave prediction, as described above.

When $$\sum_{i=0}^{n-1} |X_{i,0} - X''_{i-1,0}| \le \sum_{i=0}^{n-1} |X_{i,0} - X'_{i,-1}|$$

is false, prediction unit 36 may select predicting color values vertically. In this case, the predicted color value (i.e., $P_{i,0}$) for pixel $X_{i,0}$ equals $X'_{i,-1}$. The prediction error value may be $E_{i,0}$ equals $X_{i,0}$ minus $P_{i,0}$.

In the above example, the 2D prediction is described with examples where the prediction unit 36 selects between predicting the color values vertically or horizontally. However, aspects of this disclosure are not so limited. In some examples, prediction unit 36 may predict the color values for a pixel from a diagonally located pixel. For example, prediction unit 36 predicting a color value from a horizontal block may be referred to as predicting in the 0° direction, and predicting a color value from a vertical block may be referred to as predicting in the 90° direction.

In some examples, prediction unit 36 may also predict the color value for a pixel in the 135° direction, which refers to a pixel located above and to the left of the current pixel whose color value is being predicted. In some examples, prediction unit 36 may also predict the color value for a pixel in the 45° direction, which refers to a pixel located below and to the left of the current pixel.

In examples where prediction unit 36 is configured to perform prediction in 0°, 45°, 90°, and 135°, prediction unit 36 may determine the predicted color values in the manner describe above. Prediction unit 36 may select performing the prediction in the direction that results in the smallest predicted color value.

In these examples, prediction unit 36 may utilize a two bit header that indicates the prediction direction. For example, decompression unit 24 may need to be configured with information that indicates the manner in which an image frame block was compressed. The two bit header may indicate whether prediction unit 36 utilized 0°, 45°, 90°, and 135° prediction. If only 0° or 90° prediction is used, prediction unit 36 may utilize a single bit header.

In some instances, it may not be possible for prediction unit 36 to predict a color value. For example, because there is no immediately neighboring pixel that is above or previous to the very first pixel in the image frame, prediction unit 36 may not predict that pixel when implementing 2D prediction, and may output that color value as is. Similarly, because there is no immediately neighboring pixel that is previous to the very first pixel in a line, prediction unit 36 may not predict that pixel when implementing 1D prediction, and may output that color value as is. In examples, where prediction unit 36 implements interleave prediction, to predict the second pixel in a line, prediction unit 36 may determine that the predicted color value for the second pixel in the line is 128 for the luma (Y) component, and 256 for the chroma components (Co, Cg).

As illustrated, prediction unit 36 outputs the predicted color values and the prediction error values for each pixel to block fixed length coding (BFLC) coder 42, variable length coding (VLC) coder 44, and skip mode coder 46. BFLC coder 42, VLC coder 44, and skip mode coder 46 are example coders for coding the blocks. Lossless compression unit 35 may not include some but not all of these coders, may include coders in addition to these coders, or coders different than these coders.

BFLC coder 42 may implement any known or yet to be developed fixed length coding techniques, and VLC coder 44 may implement any known or yet to be developed variable length coding techniques. Skip mode coder 46 may function as a pass through that performs no additional compression.

Also, BFLC coder 42, VLC coder 44, and skip mode coder 46 may code each of the pixels within a block (e.g., for the luma components (Y) for all 8 pixels, and for the chroma components (Co and Cg) for all 8 pixels). For example, it may be possible to code the Y component of a pixel utilizing one coding scheme, code the Co component using a different coding scheme, and code the Cg component using yet another different coding scheme. In other examples, any two of Y, Co, and Cg components may be coded using the same coding scheme, and the other coded using a different coding scheme. In yet another example, all three of Y, Co, and Cg components may be coded using the same coding scheme.

In some examples, BFLC coder 42, VLC coder 44, and skip mode coder 46 may each perform lossless compression in parallel, and output their respective compressed blocks to compressed image data selector 48. Also, pattern mode coder 40 may compress the original image data. The functionality of pattern mode coder 40 is described in more detail. For instance, BFLC coder 42, VLC coder 44 and skip mode coder 46 may compress the image data received from prediction unit 36, which predicted the image data after color value converter 32 converted the RGB values into the YCoCg color space. Pattern mode coder 40, on the other hand, may receive the original image data (e.g., the RGB values), and apply compression on those values.

In some examples, pattern mode coder 40, BFLC coder 42, VLC coder 44, and skip mode coder 46 may each include header bits in the compressed image data that indicates where the compressed image data originated from. For example, BLFC coder 42 may include header bit or bits into the compressed image data block that indicate that the compressed image data block was compressed in accordance with the BLFC compression techniques. Pattern mode coder 40, VLC coder 44, and skip mode coder 46 may similarly include header bit or bits. In this manner, when decompression unit 24 decompresses the compressed image data block, decompression unit 24 may determine the manner in which to implement the decompression based on the header bits.

As illustrated in FIG. 2, each one of pattern mode coder 40, BFLC coder 42, VLC coder 44, and skip mode coder 46 may output respective compressed image data blocks to compressed image data selector 48. In examples where each one of pattern mode coder 40, BFLC coder 42, VLC coder 44, and skip mode coder 46 compress the image frame block, compressed image data selector 48 may select the bitstream outputted by one of pattern mode coder 40, BFLC coder 42, VLC coder 44, and skip mode coder 46 based on the number of bits in the bitstream. For example, compressed image data selector 48 may select the bitstream outputted by one of pattern mode coder 40, BFLC coder 42, VLC coder 44, and skip mode coder 46 that utilizes the least number of bits to code the image frame block.

Furthermore, in some instances, the Y, Co, and Cg components may be coded using different coding schemes. In such instances, compressed image data selector 48 may concatenate the outputs of the different coders that are used to code the Y, Co, and Cg components. For example, assume that skip mode coder 46 coded the Y component, and VLC coder 44 coded the Co and Cg components. In this example, compressed image data selector 48 may concatenate the output of skip mode coder 46 (e.g., the Y component) with the outputs of VLC coder 44 (e.g., the Co and Cg components) to form one bitstream for the color values.

As illustrated in FIG. 2, compressed image data selector 48 may output the coded bitstream to lossless compressed image data selector 50. Lossless compressed image data selector 50 may also receive the output bitstream from pulse code modulation (PCM) coder 38. PCM coder 38 is described in more detail below. Lossless compressed image data selector 50 may determine whether the number of bits in the bitstream outputted by PCM coder 38 is less than or greater than number of bits in the bitstream outputted by compressed image data selector 48.

In the example techniques described in this disclosure, lossless compressed image data selector 50 may select the bitstream with the fewer number of bits. For example, if the output bitstream of compressed image data selector 48 included fewer bits than the output bitstream of PCM coder 38, then lossless compressed image data selector 50 may select the output bitstream of compressed image data selector 48. Otherwise, lossless compressed image data selector 50 may select the output bitstream of PCM coder 38.

In some examples, compressed image data selector 48 may not be necessary. In these examples, each one of pattern mode coder 40, BFLC coder 42, VLC coder 44, skip mode coder 46, and PCM coder 38 may output their respective bitstream to lossless compressed image data selector 50. In these examples, lossless compressed image data selector 50 may determine which one of pattern mode coder 40, BFLC coder 42, VLC coder 44, skip mode coder 46, and PCM coder 38 utilized the fewest number of bits to code the image frame block. Lossless compressed image data selector 50 may then select the output bitstream of the one of pattern mode coder 40, BFLC coder 42, VLC coder 44, skip mode coder 46, and PCM coder 38 that utilized the fewest number of bits to compress the image frame block.

Lossless compressed image data selector 50 may output the selected bitstream to MUX 54, and may output a value that indicates the number of bits in the selected bitstream to budget controller 52. Lossy compressed image data selector 68, of lossy compression unit 55, may similarly output the bitstream that lossy compressed image data selector 68 selected, as described below, to MUX 54, and may output a value that indicates the number of bits in the selected bitstream to budget controller 52.

Budget controller 52 may compare the received values that indicate the number of bits in the selected bitstream and compare the values to the current bit budget. If the number of bits in the bitstream outputted by lossless compressed image data selector 50 and the number of bits in the bitstream outputted by lossy compressed image data selector 68 are the same, then, in one example, budget controller 52 may select the bitstream outputted by lossless compressed image data selector 50, and cause MUX 54 to output the selected bitstream between the output of lossless compressed image data selector 50 and lossy compressed image data selector 68. In an alternate example, when the number of bits in the bitstream outputted by lossless compressed image data selector 50 and the number of bits in the bitstream outputted by lossy compressed image data selector 68 is less than the current bit budget, budget controller 52 may select the bitstream with the fewer number of bits, and cause MUX 54 to output the selected bitstream between the output of lossless compressed image data selector 50 and lossy compressed image data selector 68.

If the number of bits in the bitstream outputted by lossless compressed image data selector 50 is greater than the current bit budget, and the number of bits in the bitstream outputted by lossy compressed image data selector 68 is less than the current bit budget, then budget controller 52 may select the bitstream outputted by lossy compressed image data selector 68, and cause MUX 54 to output that bitstream. In some examples, lossy compression unit 55 may compresses the image data in such a manner that the number of bits in the bitstream outputted by lossy compressed image data selector 68 is less than or equal to the current bit budget.

As illustrated in FIG. 2, lossy compression unit 55 may include components similar to those of lossless compression unit 35 that function in a substantially similar manner. For example, prediction unit 60 of lossy compression unit 55 may function similarly as prediction unit 36 of lossless compression unit 35. BFLC coder 62, VLC coder 64, and PCM coder 66 of lossy compression unit 55 may function similarly as BFLC coder 42, VLC coder 44, and PCM coder 38 of lossless compression unit 35. Also, lossy compressed image data selector 68 of lossy compression unit 55 may function similarly as lossless compressed image data selector 50. In some examples, lossy compression unit 55 may not include skip mode coder 46 and pattern mode coder 40; although, aspects described in this disclosure should not be considered so limiting.

However, lossy compression unit 55 may include quantizer 58, and lossless compression unit 35 may not include a quantizer. Quantizer 58 may quantize the color values received from color value converters 56 and color value converter 32. The quantization performed by quantizer 58 may reduce the precision of the color values. For example, the output of quantizer 58 may be color values with fewer bits than the number of bits in color values received by quantizer 58.

It may not be possible to recover the bits lost in the quantization performed by quantizer 58, which causes the output of lossy compression unit 55 to be "lossy." For example, if lossless compression unit 35 compressed the image frame block, then when decompression unit 24 decompresses the compressed image frame block, decompression unit 24 may be able to recover the original color values of the image frame block. For instance, the recovered color values, as determined by decompression unit 24, may be substantially similar and potentially identical to the color values received by compression unit 20. However, if the lossy compression unit 55 compressed the image frame block, then when compression unit 24 decompresses the compressed image frame block, decompression unit 24 may not be able to recover the exact original color values because some bits of the original color values may be lost in the quantization performed by quantizer 58.

In some examples, quantizer 58 may quantize the bits of the current block such that a number of the quantized bits is less than or equal to the current bit budget. For example, quantizer 58 may receive YCoCg values. Quantizer 58 may quantize the number of bits for the Y, Co, and Cg components such that total number of bits after quantization is less than or equal to the current bit budget. As one example, quantizer 58 may determine an amount of quantization that is to be applied to the color values based on the current bit budget. Quantizer 58 may then quantize bits of the color values based on the determined amount of quantization to guarantee that number of bits of the color values after quantization is less than or equal to the current bit budget.

As illustrated, prediction unit 60, BFLC coder 62, VLC coder 64, and PCM coder 66 may perform compression on the quantized bits of the color values as outputted by quantizer 58. Lossy compressed image data selector 68 may select the output bitstream from one of BFLC coder 62, VLC coder 64, and PCM coder 66 that has the fewest number of bits. Lossy compression image data selector 68 may output the selected bitstream to MUX 54, and output the number of bits in the selected bitstream to budget controller 52. Budget controller 52 may then select between the output bitstream of lossless compressed image data selector 50 and lossy compressed image data selector 68, and in turn cause MUX 54 to output the selected bitstream as described above.

In other examples, rather than performing the compression techniques in parallel, compression unit 20 may determine which type of compression technique should be utilized. For instance, although not illustrated in FIG. 2, lossless compression unit 35 and lossy compression unit 55 may each include a coding mode decision unit. This coding mode decision unit is illustrated in greater detail in FIGS. 18 and 19.

For example, FIG. 18 illustrates coding mode decision unit 110 and pulse code modulation (PCM) decision unit 108. PCM decision unit 108 may determine whether pulse code modulation (PCM) compression should be performed by PCM coder 38 of FIG. 2, as described in more detail below. In examples where PCM compression is not be performed, as determined by PCM decision unit 108, coding mode decision unit 110 may receive the output from prediction unit 36 and may determine which type of coding lossless compression unit 35 should perform. In other words, in examples where compression unit 20 may determine a-priori which type of compression technique to implement, lossless compression unit 35 may include PCM mode decision unit 108 and coding mode decision unit 110 configured in the manner illustrated in FIG. 18.

For example, in such examples, lossless compression unit 35 of compression unit 20 may include PCM mode decision unit 108 that receives the original image data block and the output of color value converter 32. Prediction unit 36 of lossless compression unit 35 may be coupled to PCM mode decision unit 108 and coding mode decision unit 110. Coding mode decision unit 110 may be coupled to each one of pattern mode coder 40, BFLC coder 42, VLC coder 44, and skip mode coder 46.

PCM mode decision unit 108 may receive the RGB color values of the original image frame block and the YCoCg color values from color value converter 32. PCM mode decision unit 108 may determine whether the number of bits in the RGB color values is less than the number of bits in the YCoCg color values. If the number of bits in the RGB color values is less than the number of bits in the YCoCg, then PCM mode decision unit 108 may output the RGB color values to PCM coder 38 for coding in the manner described in more detail below.

If, however, the number of bits in the RGB color values is greater than the number of bits in the YCoCg, then PCM mode decision unit 108 may output the YCoCg color values to prediction unit 36, and PCM coder 38 may not perform the coding. Prediction unit 36 may perform the 1D or 2D prediction as described above, and output the resulting values to coding mode decision unit 110.

Coding mode decision unit 110, of FIG. 18, may be configured to determine whether the image frame block, as received by color value converter 32, should be coded by skip mode coder 46, VLC coder 44, BFLC coder 42, or pattern mode coder 40. Coding mode decision unit 110 may also determine the manner in which each of the Y, Co, and Cg components should be coded. For example, it may be possible that coding mode decision unit 110 determines that the Y component should be coded using skip mode coder 46, the Co component should be coded using VLC coder 44, and the Cg component should be coded using BFLC coder 42. Other permutations and combinations may be possible including examples where coding mode decision unit 110 determines that two of the Y, Co, and Cg components should be coded using the same coding scheme, and the other should be coded using a different coding scheme, and examples where coding mode decision unit 110 determines that all three of the Y, Co, and Cg components should be coded using the same coding scheme.

For example, in examples where one of BFLC coder 42, VLC coder 44, and skip mode coder 46 performs the compression, coding mode decision unit 110 may determine an Idx value for each of the predicted color values. One of BFLC coder 42, VLC coder 44, and skip mode coder 46 may compress the block based on the Idx value. The Idx value may be considered as a value that represents the prediction error, and may be associated with each pixel. For example, the prediction error (e.g., $E_{i,0}$) may be a negative or positive value and the Idx values may be based on the prediction error value, and may be a positive value.

The $Idx_{i,0}$ value may equal $(\oplus E_{i,0}|\ll 1)$–neg, where neg=1 when $E_{i,0}<0$, and neg=0 otherwise. The "$\ll$" symbol represents a leftward bit shift, and $|E_{i,0}|\ll 1$ means a leftward bit shift of one bit. A leftward bit shift of one bit is equivalent to multiplying the $|E_{i,0}|$ value by 2 (e.g., $2^1$). It may be less complicated for coding mode decision unit 110 to shift by one bit, then multiply by 2; although, it is equivalent to do either.

As used in this disclosure the "$\gg$" symbol represents a rightward bit shift, and is equivalent to the division operation, just as the "$\ll$" is equivalent to the multiplication operation. The "$\ll$" and "$\gg$" bit shift operations may be limited to multiplying and dividing by factors of 2. For example, a leftward shift of one bit is equivalent to multiplying by $2^1$, a leftward shift of two bits is equivalent to multiplying by $2^2$, a leftward shift of three bits is equivalent to multiplying by $2^3$, and so forth. Similarly, a rightward shift of one bit is equivalent to dividing by $2^1$, a rightward shift of two bits is equivalent to dividing by $2^2$, a rightward shift of three bits is equivalent to dividing by $2^3$, and so forth. The rightward shift may include downward rounding (i.e., towards negative infinity).

When prediction unit 36 utilizes 2D prediction, coding mode decision unit 110 may set the $Idx_{i,0}$ value as 0 for the very first pixel of the image frame. Also, when prediction unit 36 utilizes 1D prediction, coding mode decision unit 110 may set $Idx_{i,0}$ as 0 for the very first pixel of a line.

If the Idx values for each predicted color value in a block is 0, then coding mode decision unit 110 may determine that skip mode coder 46 should code the block. Again, skip mode coder 46 may function as a pass through without any additional coding. Also, skip mode coder 46 may add two or three bits to the header of the block to specify that the block is a skip block.

If the following equation is true, then coding mode decision unit 110 may determine that BFLC coder 42 should code the block. Otherwise, coding mode decision unit 110 may determine that VLC coder 44 should code the block. BFLC coder 42 and VLC coder 44 may code the block in such a way that fewer bits are needed to represent the received bits. In other words, BFLC coder 42 and VLC coder 44 may receive a block and output a compressed block, where the received block and the compressed block represent the same color values, but the number of bits in the compressed block is less than the number of bits in the received block.

For example, BFLC coder 42 may code the block if coding mode decision unit 110 determines that $$n * \text{bit}\left(\max\left(\bigcup_{i=0}^{n-1} Idx_{i,0}\right)\right) - \sum_{i=0}^{n-1} len_{vlc}(Idx_{i,0}) + 4 \leq 0$$

In the above equation, n is the size of the block (e.g., 8 pixels), and $len_{vlc}$ is the length of Idx, whose value can be found in Table 1 below. The bit( ) is the number of bits needed to represent the maximum value of Idx in a block. For example, assume that the Idx values for a block are {3, 0, 10, 1, 0, 2, 2, 7}, then the maximum value is 10, and the number of bits needed to represent 10 is 4. In this example, the value of bit( ) is 4.

Figure 4:
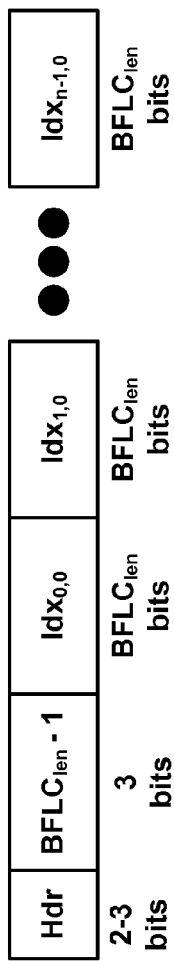
FIG. 4 is a conceptual diagram illustrating one example of the manner in which to perform block fixed-length coding (BFLC).

FIG. 4 is a conceptual diagram illustrating one example of the manner in which to perform block fixed-length coding (BFLC). For instance, FIG. 4 illustrates one example of the output bitstream of BFLC coder 42. However, BFLC coder 42 may fixed-length code the color values utilizing any fixed-length coding technique, and FIG. 4 is one example of such coding.

For instance, the example illustrated in FIG. 4 may rely upon the Idx value. As described above, in some examples, coding mode decision unit 110 may determine the Idx values. However, in examples where compression unit 20 does not include coding mode decision unit 110 (e.g., in examples where compression unit 20 performs the compression in parallel without first determining which type of compression should be utilized), BFLC coder 42 may determine the value of Idx. Moreover, it may not be necessary for BFLC coder 42 to rely upon Idx for compression in every example, and BFLC coder 42 may fixed-length code the color values utilizing techniques that do not rely upon the Idx value.

In FIG. 4, $\mathrm{BFLC}_{len}$ denotes the code length of each index (Idx). For example, $\mathrm{BFLC}_{len}$ may equal:

$$\mathrm{bit}\left(\max\left(\bigcup_{i=0}^{n-1} Idx_{i,0}\right)\right)$$

With this definition of $\mathrm{BFLC}_{len}$, FIG. 4 illustrates the manner in which the indices (Idx) may be coded. In FIG. 4, the header (Hdr) and its length may depend on the compression modes that compression unit 20. The examples of Hdr are described in more detail below.

Figure 5:
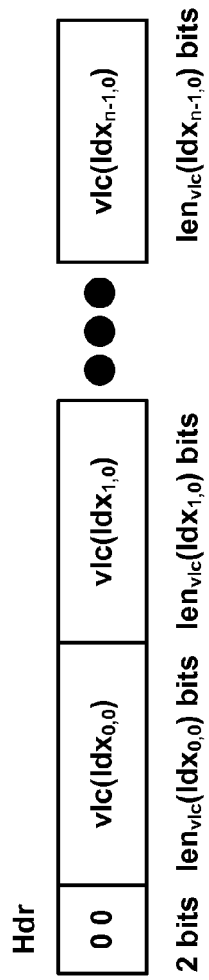
FIG. 5 is a conceptual diagram illustrating one example of the manner in which to perform variable length coding (VLC).

FIG. 5 is a conceptual diagram illustrating one example of the manner in which to perform variable length coding (VLC). For instance, FIG. 5 illustrates one example of the output bitstream of VLC coder 44. However, VLC coder 44 may variable length code the color values utilizing any variable length coding technique, and FIG. 5 is one example of such coding. Again, like BFLC coder 42, VLC coder 44 may rely upon the Idx values, and in examples where compression unit 20 does not include coding mode decision unit 110, VLC coder 44 may determine the Idx value. Furthermore, VLC coder 44 may not need to rely on the Idx value for compression in every example. For example, VLC coder 44 may implement variable length coding techniques that do not rely upon the Idx value.

For VLC coding, VLC coder 44 may utilize an exponential Golomb code. Table 1 below indicates the codes that VLC coder 44 may utilize to code the indices (Idx). Furthermore, Table 1 includes example values for the $\mathrm{len}_{vlc}$. As described above, with respect to the BFLC coding, BFLC coder 42 may code the block based on the value of $\mathrm{len}_{vlc}$. BFLC coder 42 may determine the value of $\mathrm{len}_{vlc}$ based on the values in Table 1.

TABLE 1

| Idx | $\mathrm{len}_{vlc}$ | vlc (binary) |
|---|---|---|
| 0 | 1 | 1 |
| 1 | 3 | 010 |
| 2 | 3 | 011 |
| 3 | 5 | 00100 |
| 4 | 5 | 00101 |
| 5 | 5 | 00110 |
| 6 | 5 | 00111 |
| ... | ... | ... |

As illustrated, compression unit 20 includes pulse code modulation (PCM) coder 38. In some examples, as illustrated in FIG. 18, lossless compression unit 35 may include PCM mode decision unit 108, which may determine whether the number of bits in the in the RGB color values is less than the number of bits in the YCoCg color values, as described above. When the number of bits in the RGB color values is less than the number of bits in the YCoCg color values, PCM mode decision unit 108 may determine that original image data block should be compressed using PCM coder 38. PCM coder 38 may code the image frame block using pulse code modulation techniques. PCM coder 38 may add a header bit to indicate that the bits from PCM coding.

When false (i.e., YCoCg bits is less than RGB bits), PCM mode decision unit 108 may output the color space converted color values (e.g., the YCoCg bits) to coding mode decision unit 110. Coding mode decision unit 110 may then function in the manner described in this disclosure to determine whether to code the color values using pattern mode coder 40, BFLC coder 42, VLC coder 44, or skip mode coder 46.

In some examples, such as examples where compression unit 20 includes coding mode decision unit 110, as described above, compressed image data selector 48 may receive the output bit stream of one of pattern mode coder 40, BFLC coder 42, VLC coder 44, and skip mode coder 46. In this example, compressed image data selector 48 may function as a pass-through that passes through the output from one of pattern mode coder 40, BFLC coder 42, VLC coder 44, and skip mode coder 46 as selected by coding mode decision unit 110.

In other words, in some examples, coding mode decision unit 110 may determine whether the image frame block should be coded using pattern mode coder 40, BFLC coder 42, VLC coder 44, or skip mode coder 46. In these examples, the one of pattern mode coder 40, BFLC coder 42, VLC coder 44, and skip mode coder 46 that coding mode decision unit 110 determined should be used for coding the image frame block may output its bitstream to compressed image data selector 48, which in turns outputs the bitstream.

In some examples where compression unit 20 includes coding mode decision unit 110, compressed image data selector 48 may not necessarily function as merely a pass-through. For example, pattern mode coder 40, BFLC coder 42, VLC coder 44, and skip mode coder 46 may output their respective bitstreams to compressed image data selector 48 which may concatenate the outputs as appropriate. For example, if BFLC coder 42 coded the Y component and VLC coder 44 coded the Co and Cg components, compressed image data selector 48 may select the ordering of the outputs to form a single bitstream. For example, compressed image data selector 48 may select the output such that the order is YCoCg. In this example, compressed image data selector 48 may select the output BFLC coder 42 because it is for the Y component, and concatenate the output from the BFLC coder 42 with the outputs from VLC coder 44 that are for the Co and Cg components.

Lossless compressed image data selector 50 may receive the outputs from PCM coder 38 or compressed image data selector 48 based on which one was utilized as determined by PCM mode decision unit 108. Lossless compressed image data selector 50 may then output the received bitstream to budget controller 52 which may then perform functions in the manner described above.

Figure 6:
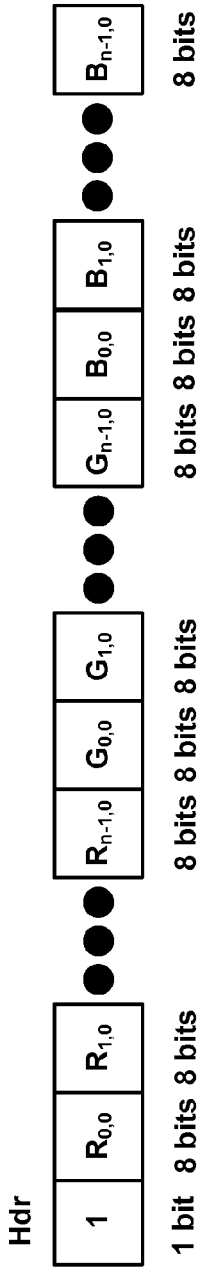
FIG. 6 is a conceptual diagram illustrating one example of the manner in which the PCM coder functions.

FIG. 6 is a conceptual diagram illustrating one example of the manner in which the PCM coder functions. For instance, FIG. 6 illustrates one example of the output bitstream of PCM coder 38. As illustrated, the output of PCM coder 38 includes a header bit, followed by the original 8 bits for each of the red, green, and blue components for the 8 pixels of the original image frame block.

In some examples, compression unit 20 may also include pattern mode coder 40. Some test patterns may be designed to be very challenging for using with prediction unit 36, and may not accurately represent image frames composed by image processor 14 during normal operation. For example, some test patterns may be designed such that utilizing 1D prediction results in relatively large prediction error values, which may minimize the benefits achieved by 1D prediction. While these test patterns may be challenging for 1D prediction, these test patterns may be limited in the number of different colors that are in a block of the image frame. For these test patterns, pattern mode coder 40 may be able suitable to code the image frame block.

Figure 7:
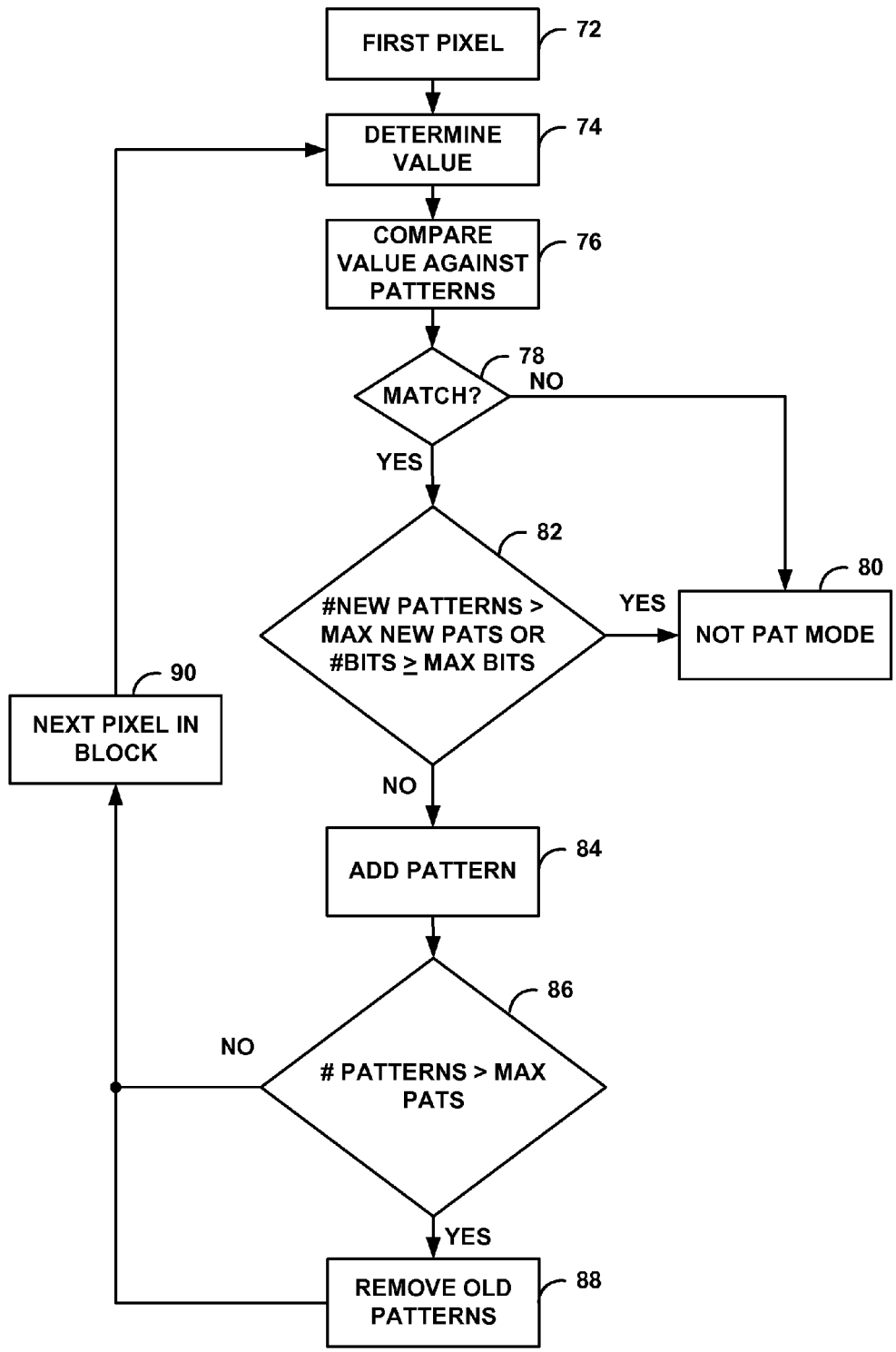
FIG. 7 is a flowchart illustrating an example manner in which the coding mode decision unit may determine whether the image frame is a test pattern.

FIG. 7 is a flowchart illustrating an example manner in which the coding mode decision unit may determine whether the image frame is a test pattern. For example, coding mode decision unit 110 may implement the example flowchart illustrated in FIG. 7 to determine whether the image data is for a test pattern, and may determine that pattern mode coder 40 should compress the image data. As illustrated, coding mode decision unit 110 receives the first pixel of the image frame block (72). Coding mode decision unit 110 may determine a value (74). The value may be R+(G<<8)+(B<<16), where R, G, and B refer to the red, green, and blue components respectively. In other words, the value may be the value of the red component plus the value of the green component multiplied by $2^8$ plus the value of the blue component multiplied by $2^{16}$ Coding mode decision unit 110 may compare the value against values of patterns in a database (76). For example, devoce 12 or panel devoce 16 may store a plurality of patterns in as a database in the memory of devoce 12 or panel devoce 16, as appropriate. Coding mode decision unit 110 may compare the value against the patterns stored in the databases in devoce 12 or panel devoce 16.

Coding mode decision unit 110 may determine whether there is a match between value and the patterns (78). If there is no match (NO of 78), then coding mode decision unit 110 may determine that pattern mode coder 38 should not be used (80). If there is match (YES of 78), then coding mode decision unit 110 may determine whether the number of new patterns is greater than maximum number of new patterns or whether the number of bits is greater than or equal to the maximum number of bits.

The number of new patterns may be patterns that coding mode decision unit 110 added to the database, and the maximum number of new patterns may be the maximum number of new patterns that the coding mode decision unit may add. As one example, the maximum number of new patters may be three; however, this number may be configurable and may be different than three.

The number of bits may be the number of bits in the original image frame block. The maximum number of bits may be the number of bits spent by one of the non-pattern mode coders. For example, the maximum number of bits may be the number of bits outputted by BFLC coder 42 or VLC coder 44.

If the number of new patterns is greater than maximum number of new patterns or if the number of bits is greater than or equal to the maximum number of bits (YES of 82), coding mode decision unit 110 may determine that pattern mode coder 38 should not be used (80). Otherwise (NO of 82), coding mode decision unit 110 may add the pattern to the database (84).

Coding mode decision unit 110 may determine whether the number of patterns is greater than maximum number of patterns in the database (86). As one example, the maximum number of patterns in the database may be 16; however, this number may be configurable and may be different than 16.

If the number of patterns is not greater than the maximum number of patterns in the database (NO of 86), coding mode decision unit 110 may proceed to the next pixel in the block (90), and repeat the steps. Otherwise (YES of 86), coding mode decision unit 110 may remove one or more of the old patterns in the database (88). Coding mode decision unit 110 may then proceed to the next pixel in the block 90), and repeat the steps.

Figure 8:
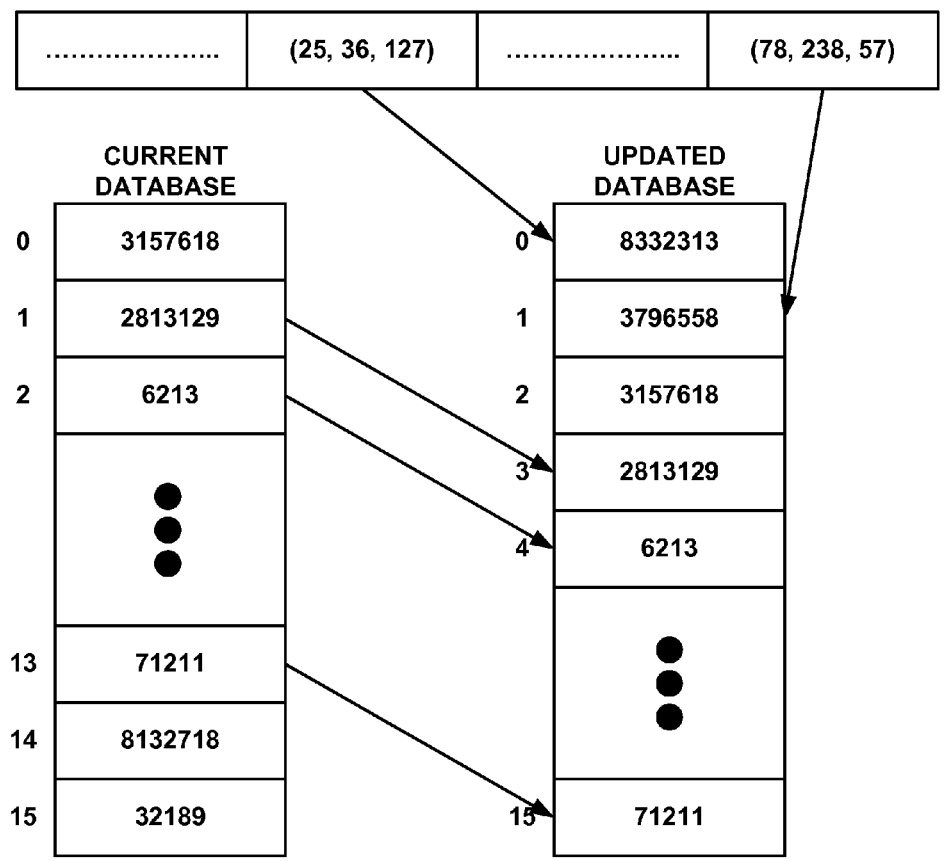
FIG. 8 is a conceptual diagram illustrating a manner in which the coding mode decision unit updates the pattern database.

FIG. 8 is a conceptual diagram illustrating a manner in which the coding mode decision unit updates the pattern database. For example, FIG. 8 illustrates an image frame block where the RGB color values for one pixel is (25, 36, 127) and the RGB color values for another pixel is (78, 238, 57). Coding mode decision unit 110 may determine the value for the pixel with color value (25, 36, 127) to be 8,332,313 (e.g., $25+2^8*36+2^{16}*127$ equals 8,332,313) in step 74 of FIG. 7, and may determine the value for the pixel with color value (78, 238, 57) to be 3,796,558 (e.g., $78+2^8*238+2^{16}*57$ equals 3,796,558) in step 74 of FIG. 7.

FIG. 8 illustrates a current database with values, and an updated database with new values that are added for the pixels of the blocks with RGB color values of (25, 36, 127) and (78, 238, 57). For example, in the updated database, the values in 14 and 15 index of the current database are removed, and values in 0 through 13 are shifted down by two. The updated database includes the values 8,332,313 which corresponds to the pixel of the image frame block with RGB color value of (25, 36, 127), and 3,796,558 which corresponds to the pixel of the image frame block with RGB color value (78, 238, 57).

Figure 9:
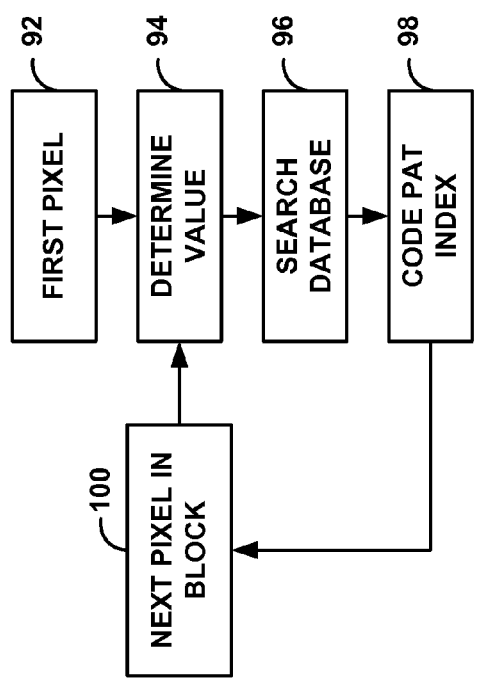
FIG. 9 is a flowchart illustrating an example technique for pattern mode coding.

FIG. 9 a flowchart illustrating an example technique for pattern mode coding. For example, pattern mode coder 40 may implement the techniques illustrated in FIG. 9. As illustrated in FIG. 9, pattern mode coder 40 may receive the first pixel of the image frame block (92). Pattern mode coder 40 may determine a value of the pixel in a manner similar to that described above with respect to step 74 of FIG. 7 (94). For example, pattern mode coder 40 may determine the value to be R+(G<<8)+(B<<16).

Pattern mode coder 40 may then search the pattern database (96). Pattern mode coder 40 may code the pattern index (Idx) (98). In some examples, pattern mode coder 40 may code the pattern index based on the number of patterns in the database. For example, if the number of patterns in the database is between five and eight, pattern mode coder 40 may code the pattern index with three bits. Pattern mode coder 40 may proceed with the next pixel in the block (100), and repeat the steps.

Figure 10:
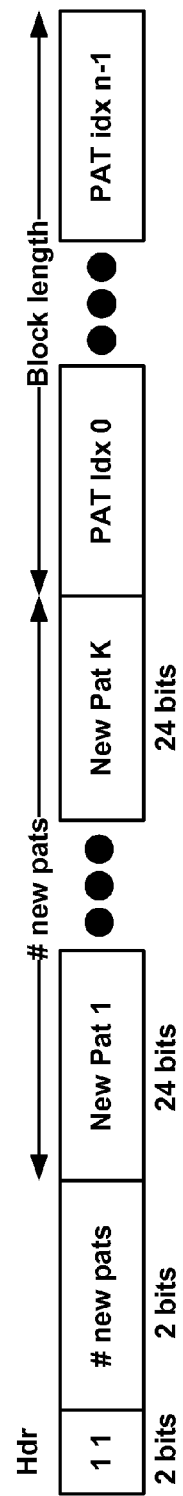
FIG. 10 is a conceptual diagram that illustrates one example of the output bitstream of a pattern mode coder.

FIG. 10 is a conceptual diagram that illustrates one example of the output bitstream of a pattern mode coder. As illustrated, the header may be 2 bits, and the number of new patterns recognized by pattern mode coder 40 may be 2 bits. As illustrated, pattern mode coder 40 may assign 24 bits to represent each of the values determined in step 74 of FIG. 7. For example, as illustrated in FIG. 8, there may be 15 patterns in the database, of which two are new patterns. Accordingly, for this example, the value of K in FIG. 10 would 2, and pattern mode coder 40 may utilize 24 bits to represent the value of 8,332,313 and 24 bits to represent the value of 3,796, 558.

As described above, the header in the output bitstream of PCM coder 38, pattern mode coder 40, BFLC coder 42, VLC coder 44, and skip mode coder 46 may be based on the various coding techniques that compression unit 20 may be configured to implement. In some examples, the output bitstream of PCM coder 38, pattern mode coder 40, BFLC coder 42, VLC coder 44, and skip mode coder 46 may include an initial one bit value, and the header may follow the initial one bit.

Table 2 includes example header values based on the types of coding that compression unit 20 may be configured to implement. The example header values in Table 2 are provided for purposes of illustration and should not be considered limiting. The specific header values may be different for different examples, and may be selected such that decompression unit 24 may be able to determine the type of coding that was used when decompressing the compressed block of the image frame.

Furthermore, in Table 2, it is assumed that compression unit 20 may implement skip mode coder 46, VLC coder 44, and PCM coder 38, and compression unit 20 may or may not implement BFLC coder 42 and pattern mode coder 40. However, this is provided for illustration purposes only. In different examples, compression unit 20 may be configured to implement different ones of skip mode coder 46, VLC coder 44, PCM coder 38, BFLC coder 42, and pattern mode coder 40. For example, in another example, compression unit 20 may be configured to implement BFLC coder 42, VLC coder 44, and PCM coder 38, and compression unit 20 may or may not implement skip mode coder 46 and pattern mode coder 40. Various permutations and combinations may be possible, and the techniques described in this disclosure should not be considered limited to the example indicated in Table 2.

TABLE 2

| Mode Header | BFLC mode allowed Yes | BFLC mode allowed No | PAT mode allowed Yes | PAT mode allowed No |
|---|---|---|---|---|
| SKIP mode hdr | 011 (3 bits) | 01 (2 bits) | 011 (3 bits) | 01 (2 bits) |
| VLC mode hdr | 00 (2 bits) | 00 (2 bits) | 00 (2 bits) | 00 (2 bits) |
| PCM mode hdr | See right | | 10 (2 bits) | 1 (1 bit) |
| BFLC mode hdr | 010 (3 bits) | NA | See left | |
| PAT mode hdr | See right | | 11 (2 bits) | NA |

The preceding examples describe the manner in which components of the lossless compression unit 35 function. In aspects described in this disclosure, the corresponding components in lossy compression unit 55 may function in a substantially similar manner. However, with lossy compression unit 55, the image data may be quantized with quantizer 58 prior to compression.

Furthermore, similar to lossless compression unit 35, lossy compression unit 55 may also include a PCM mode decision unit and a coding mode decision unit 114, as illustrated in FIG. 19. However, lossy compression unit 55 may not include a PCM mode decision unit and a coding mode decision unit in every example. For instance, in some examples, lossy compression unit 55 may implement various lossy compression techniques without a-priori determination as to which type of lossy compression technique to implement. In these examples, lossy compression unit 55 may implement the various lossy compression techniques in parallel, and lossy compressed image data selector 68 may select from the lossy compressed image data each compressed in accordance with the different lossy compression techniques.

As illustrated in FIG. 19, lossy compression unit 55 may include PCM mode decision unit 112 that is coupled to quantizer 58, and may determine whether the number of bits of the quantized YCoCg color values are greater than the number of bits of the original RGB color values for the image frame block. When true, PCM mode decision unit 112 may determine that PCM coder 66 should compress the quantized image data.

Otherwise, PCM mode decision unit 112 may transmit the quantized YCoCg color values to prediction unit 60, which may perform prediction in a manner similar to that described above with respect to prediction unit 36. Coding mode decision unit 114 may receive the output of prediction unit 60 and may determine whether to BFLC code or VLC code the quantized image frame block. For example, coding mode decision unit 114 may determine whether to BFLC code or VLC code in a manner similar to that described above with respect to coding mode decision unit 110.

For instance, coding mode decision unit 114 may determine the manner in which each of the quantized Y component, quantized Co component, and quantized Cg component should be coded. In this example, coding mode decision unit 114 may determine whether the following equation is true for the quantized Y component, and if true coding mode decision unit 114 may determine that BFLC coder 62 should code the quantized Y component. Otherwise, coding mode decision unit 114 may determine that VLC coder 64 should code the quantized Y component. Coding mode decision unit 114 may similarly determine the manner in which the quantized Co and Cg components should be coded.

$$n * \mathrm{bit}\left(\max\left(\bigcup_{i=0}^{n-1} Idx_{i,0}\right)\right) - \sum_{i=0}^{n-1} len_{vlc}(Idx_{i,0}) + 4 \leq 0$$

In FIG. 19, one of BFLC coder 62, VLC coder 64, and PMC coder 66 may output their respective bitstreams to lossy compressed image data selector 68. Lossy compressed image data selector 68, in this example, may concatenate the compressed quantized Y, quantized Co, and quantized Cg components to form a single bitstream. Lossy compressed image data selector 68 may output the bitstream to budget controller 52, which in turns determines whether to cause MUX 54 to output the bitstream from lossy compressed image data selector 68 or lossless compressed image data selector 50, as described above.

Figures 11, 12:
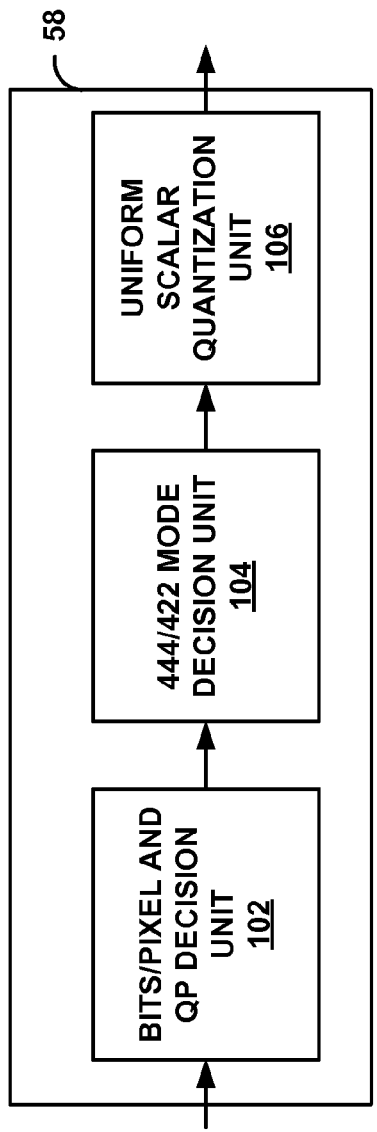
FIG. 11 is a block diagram illustrating an example of a quantizer of FIG. 2 in greater detail.
FIG. 12 is tabular diagram illustrating example table entries.

FIG. 11 is a block diagram illustrating an example of a quantizer of FIG. 2 in greater detail. For example, FIG. 11 illustrates quantizer 58 in greater detail. As illustrated, quantizer 58 includes bits/pixel and quantization parameter (QP) decision unit 102, 444/422 mode decision unit 104, and uniform scaler quantization unit 106.

Bits/pixel and QP decision unit 102 may determine bits per pixel for all three components (e.g., for Y, Co, and Cg) for each of the color values in the image frame block. The bits/pixel may be referred to as $\mathrm{bit}_{lossy}$, and unit 102 may calculate the $\mathrm{bit}_{lossy}$ value based on the below equation.

$\mathrm{Bit}_{lossy}$=(current bit budget−header length)>>block length in bits, where current bit budget is the current bit budget as determined by budget controller 52, header length is the number of bits added to the header and is three, as an example value, but may be different based on the possible compression modes as indicated in Table 2, and block length in bits is three, as one example, but may be different. For example, the block length in bits value may be set to three for examples where the block size is 8 pixels.

In this example, subtracting the header length from the current bit budget indicates how many bits are available to compress the current block. The operation ">>block length in bits" means that the result of the subtraction is right shifted by the block length in bits. The block length in bits is three in this example because $2^3$ is 8, and there are 8 pixels per block. In other words, the $\mathrm{Bit}_{lossy}$ equation is equivalent to determining the number of bits in the current budget that are available for compressing a block, and dividing the number of bits in the current budget that are available for compressing a block by the number of pixels per block. The result of the division is the number of bits available per pixel.

Based on the calculation for $bit_{lossy}$, unit 102 may determine the value of $bit_{Y,lossy}$, where $bit_{Y,lossy}$ may indicate the number of bits for the Y component. For example, $bit_{lossy}$ indicates the number of bits that are available for a pixel. Because a pixel is defined by its luma (Y) and chroma (Co and Cg) components, unit 102 may determine the number of bits that are available for the luma and chroma components of a pixel based on the total number of bits that are available for that pixel.

In accordance with techniques described in this disclosure for determining the number of bits for the luma component (referred to as $bit_{Y,lossy}$), unit 102 may determine the value of $bit_{Y,lossy}$ based on the values in Table 3 illustrated in FIG. 12. FIG. 12 is tabular diagram illustrating example entries of Table 3. The table entries of Table 3 are provided for purposes of illustration and should not be considered limiting. For example, the table entries of Table 3 may be configurable. In general, bigger values for $bit_{lossy}$ results in more bits for the luma component (i.e., Y) and fewer bits for the chroma components (Co and Cg), and smaller values for $bit_{lossy}$ results in fewer bits for the luma component, and more bits for the chroma components. Unit 102 may utilize Table 3 to determine an amount of quantization to be applied to the luma component based on the current bit budget.

As illustrated in FIG. 12, the number of bits for the luma component ($bit_{Y,lossy}$) is based on the total number bits available for the pixel ($Bit_{lossy}$). Based on the number of bits of the Y component, bits/pixel and QP decision unit 102 may determine the bits for the chroma components, represented as $bit_{C,lossy}$. For example, unit 102 may determine the value for $bit_{C,lossy}$ based on the following equation.

$Bit_{C,lossy} = (Bit_{lossy} - Bit_{Y,lossy}) >> 1$. The ">>1" operation is equivalent to dividing ($Bit_{lossy} - Bit_{Y,lossy}$) by $2^1$. The value resulting from $Bit_{lossy} - Bit_{Y,lossy}$ is divided by two because there are two chroma components Co and Cg. In this manner, unit 102 may determine an amount of quantization to be applied to chroma components based on the current bit budget.

In accordance with the techniques described in this disclosure, for lossy compression, the total number of bits available for compressing a block is limited to the total number of bits available in the current bit budget (i.e., the total number of bits for a block equals current bit budget minus the header length). Therefore, after further compression by one of BFLC coder 62, VLC coder 64, and PCM coder 66, the lossy compressed block is guaranteed to be less than or equal to the current bit budget. Accordingly, even if the lossless compressed image frame block is greater than the current bit budget, the lossy compressed image frame block is guaranteed to be less than or equal to the current bit budget.

As described above, the compression techniques may allow a reduction in the size of frame buffer 22. To ensure that there is no overflow, it may be desirable to configure compression unit 20 such that compression unit 20 is guaranteed to meet the target compression. By ensuring that the lossy compression image frame block will be within the current bit budget, there may be assurance that compression unit 20 will not output more bits than can be stored in the reduced sized frame buffer 22.

Unit 102 may then determine quantization step bits (e.g., qp bits) for the luma and the chroma components. For example, the quantization step bits for the luma (e.g., the $qp\_bits_Y$) may equal $8 - Bit_{Y,lossy}$, and the quantization step bits for the chroma (e.g., the $qp\_bits_C$) may equal $9 - Bit_{C,lossy}$.

Unit 104 may then determine whether 444 or 422 mode should be selected for quantization. The 444 mode means that Y, Co, and Cg each have the same sampling rate. The 422 mode means that the Co and Cg components are sampled at half the sample rate as Y. The 422 mode may mean that the chroma components are subsampled.

In some examples, when $Bit_{C,lossy}$ is small, chroma subsampling (e.g., 422 mode) may improve image quality. For example, unit 104 may select 422 mode and subsample the chroma components by dropping even pixels. In some examples, unit 104 may select 422 mode, when the following equation is true. Otherwise, unit 104 may select 444 mode, which may mean no subsampling of the chroma components.

$$\sum_{i=0}^{n>>1} |\tilde{x}_{2i+1} + \tilde{x}_{2i-1} - (x_{2i} << 1)| \le (1 << (qp\_bits_c + bias))$$

The value of bias may be configuration. In some examples, a higher value of bias may mean that unit 104 may select 422 mode more often than 444 mode.

Unit 106 may receive the output from unit 104. For uniform scalar quantization, unit 106 may right shift each sample by qp_bits (e.g., $qp\_bits_Y$ for luma and $qp\_bits_C$ for chroma components). The output of unit 106 may be the output of quantizer 58. For example, prediction unit 60 and PCM coder 66 may receive the output from unit 106 of quantizer 58. BFLC coder 62 and VLC coder 64 may receive the output of prediction unit 60 in examples where lossy compression unit 55 does not include PCM mode decision unit 112 and coding mode decision unit 114. In examples, where lossy compression unit 55 includes PCM mode decision unit 112 and coding mode decision unit 114, PCM mode decision unit 112 and coding mode decision unit 114 may function in the manner described above.

Figure 13:
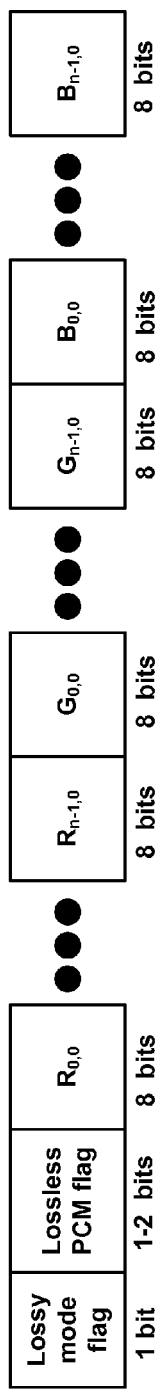
FIGS. 13-15 are conceptual diagrams illustrating examples of lossless bitstreams.
Figure 14:
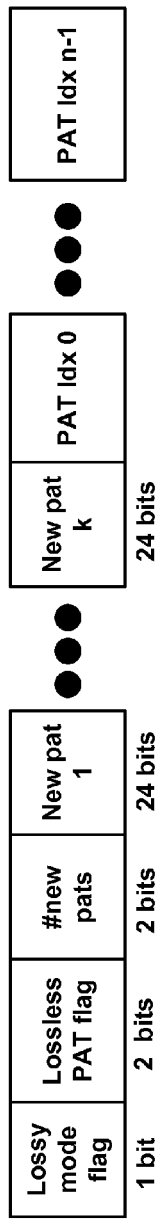
Figure 15:
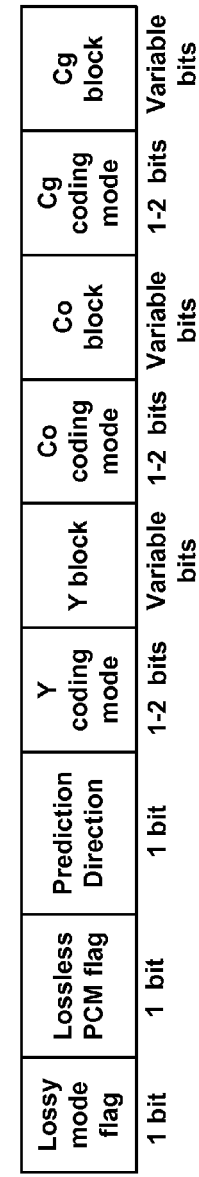
Figure 16:
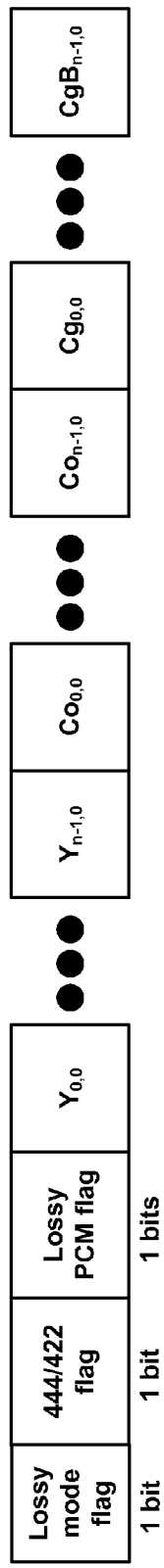
FIGS. 16 and 17 are conceptual diagrams illustrating examples of lossy bitstreams.
Figure 17:
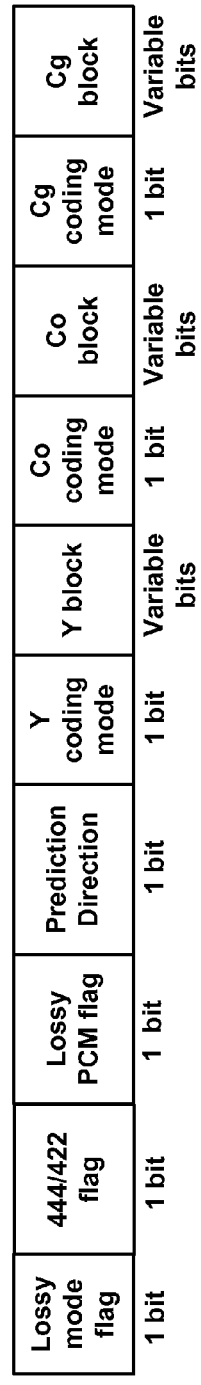

FIGS. 13-15 are conceptual diagrams illustrating examples of lossless bitstreams. FIGS. 16 and 17 are conceptual diagrams illustrating examples of lossy bitstreams. In FIGS. 13-15, the lossy mode flag may be '0' because FIGS. 13-15 illustrate examples of lossless bitstreams. In FIG. 13, the PCM flag may be '1' when compression unit 20 does not include pattern mode coder 40, and '10' when compression unit 20 includes pattern mode coder 40. The remaining portions of FIG. 13 may be substantially similar to the bitstream illustrated in FIG. 6. In FIG. 14, lossless PAT flag may be '11' to indicate that pattern mode coder 40 coded the color values. The remaining portion of FIG. 14 may be substantially similar to the bitstream illustrated in FIG. 10.

FIG. 15 illustrates the bitstream for the other coding schemes (e.g., BFLC coder 42, VLC coder 44, and skip mode coder 46). For example, lossless PCM flag may be '0.' The prediction direction bit may indicate the manner in which prediction unit 36 predicted the color values. For example, if prediction unit 36 utilized 1D prediction, then '0' may indicate progressive prediction, and '1' may indicate interleave prediction. If prediction unit 36 utilized 2D prediction, then '0' may indicate horizontal prediction, and '1' may indicate vertical prediction. In examples where prediction unit 36 may also implement diagonal prediction, the prediction direction may be represented by the two bits to indicate the prediction direction.

The Y coding mode, Co coding mode, and Cg coding mode indicate the particular coders that compression unit 20 utilized to code the Y, Co, and Cg components respectively. For example, as described above, different ones of BFLC coder 42, VLC coder 44, and skip mode coder 46 may code different ones of the Y, Co, and Cg components. The Y coding mode, Co coding mode, and Cg coding mode bits indicate which one of BFLC coder 42, VLC coder 44, and skip mode coder 46 coded the Y component, Co component, and Cg component, respectively. The Y block, Co block, and Cg block may be coded Y, Co, and Cg components. Because each of these components may utilize different number of bits after coding, the size of the Y, Co, and Cg block may be variable.

In FIGS. 16 and 17, the lossy mode flag may be '1' because FIGS. 16 and 17 illustrate examples of lossy bitstreams. FIG. 16 illustrates the example where compression unit 20 utilized PCM coder 66 to lossy code the image frame block, and accordingly, the lossy PCM flag is 1 in FIG. 16. FIG. 17 illustrates the example where compression unit 20 did not utilize PCM coder 66 to lossy code the image frame block, and accordingly, the lossy PCM flag is 0 in FIG. 17. For instance, FIG. 17 illustrates the example bitstream from coders other than PCM coder 66 such as BFLC coder 62 and VLC coder 64.

In FIGS. 16 and 17, the 444/422 flag may be '0' to indicate that quantizer 58 utilized the 444 mode for quantization, and the 444/422 flag may be '1' to indicate that quantizer 58 utilized the 422 mode for quantization. When the 444/422 flag is '1,' the Co and Cg components may be half of the Y component. The other portions in FIGS. 16 and 17 may be similar to the portions in FIGS. 13 and 15, respectively.

Figure 20:
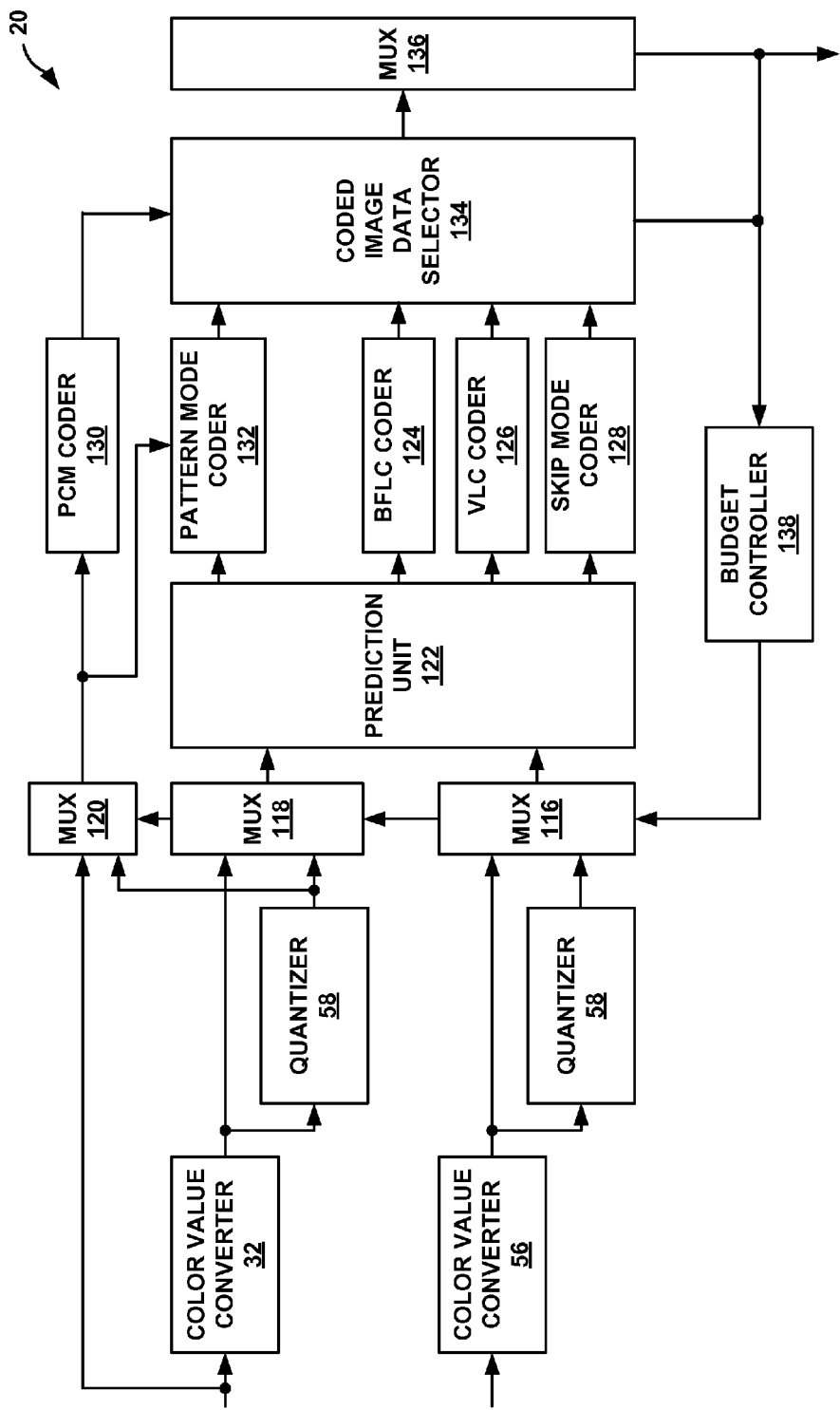
FIG. 20 is a block diagram illustrating another example of a compression unit.

FIG. 20 is a block diagram illustrating another example of a compression unit. For example, FIG. 20 illustrates an example of compression unit 20 in which various components, that were separate for lossy and lossless compression in FIG. 2, are shared. For example, prediction unit 122, BFLC coder 124, VLC coder 126, skip mode coder 128, PCM coder 130, and pattern mode coder 132 may function in a substantially similar manner as described for corresponding coders and units in FIG. 2. Budget controller 138 may also function in a manner similar to budget controller 52 in FIG. 2, and coded image data selector 134 may function in a manner similar to either one of lossless compressed image data selector 50 or lossy compressed image data selector 68.

However, in the example of FIG. 20, the compression may be performed in two passes. For example, in the first pass, budget controller 138 may select the path through MUX 116, 118, and 120 for the non-quantized image frame block (e.g., the path other than the path through quantizer 58 which is equivalent to lossless compression unit 35). Prediction unit 122 may perform 1D or 2D prediction, as described above, and output to pattern mode coder 132, BFLC coder 124, VLC coder 126, and skip mode coder 128, each of which may perform compression in the manner described above. PCM coder 130 may also perform pulse code modulation as described above. Coded image data selector 134 may receive the output from PCM coder 130, pattern mode coder 132, BFLC coder 124, VLC coder 126, and skip mode coder 128 and determine outputted the fewest number of bits.

Coded image data selector 134 may temporally store the bitstream with the fewest number of bits, and indicate to budget controller 138 to cause MUX 116, 118, and 120 to select the path through quantizer 58 (e.g., which is equivalent to lossy compression unit 55). Prediction unit 122, PCM coder 130, pattern mode coder 132, BFLC coder 124, VLC coder 126, and skip mode coder 128 may compress the quantized image frame block in a substantially similar manner as described above for the non-quantized image frame block.

Coded image data selector 134 may select among the quantized compressed image frame that resulted in the fewest number of bits. Coded image data selector 134 may then compare the bitstream with the fewest number of bits determined using lossless compression with the bitstream with the fewest number of bits determined using lossy compression. Coded image data selector 134 may receive the current bit budget value from budget controller 138 cause MUX 136 to output the bitstream that meets the current bit budget. As before, if both the lossless and lossy bitstreams meet the current bit budget, MUX 136 may output the lossless bitstream.

Budget controller 138 may receive the number of bits outputted by MUX 136 for the current image frame block, and may determine the bit budget for the next image frame block. Compression unit 20 may then repeat the above steps for the next image frame block until there are no more blocks to be compressed. Moreover, although not illustrated, in some examples, the example of compression unit 20 illustrated in FIG. 20 may include a coding mode decision unit and the PCM mode decision unit similar to those illustrated in FIGS. 18 and 19, and that function in a manner similar to that described above.

Because the example of compression unit 20 illustrated in FIG. 20 may require two passes (e.g., one pass for the lossless compression, and another pass for the lossy compression), and the example of compression unit 20 illustrated in FIG. 2 may require a single pass, the example of compression unit 20 illustrated in FIG. 20 may operate at twice the rate (e.g., double clock speed) as compared to the example illustrated in FIG. 2 so that both output at the same time. Accordingly, the example of compression unit 20 in FIG. 20 may require smaller area, but may require operating at a higher rate, as compared to the example of compression unit 20 in FIG. 2.

Figure 21:
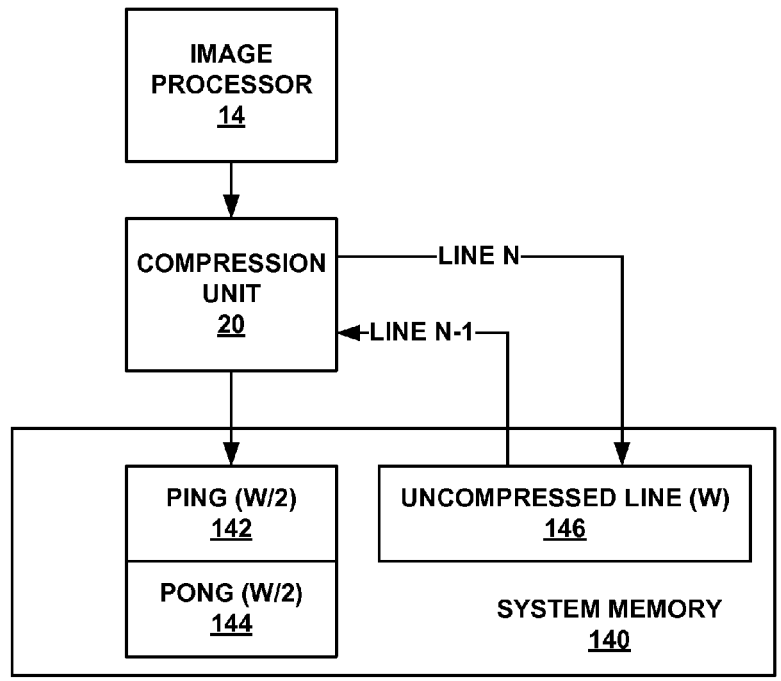
FIGS. 21 and 22 are block diagrams illustrating example manners in which an image processor transmits the color values to a compression unit.
Figure 22:
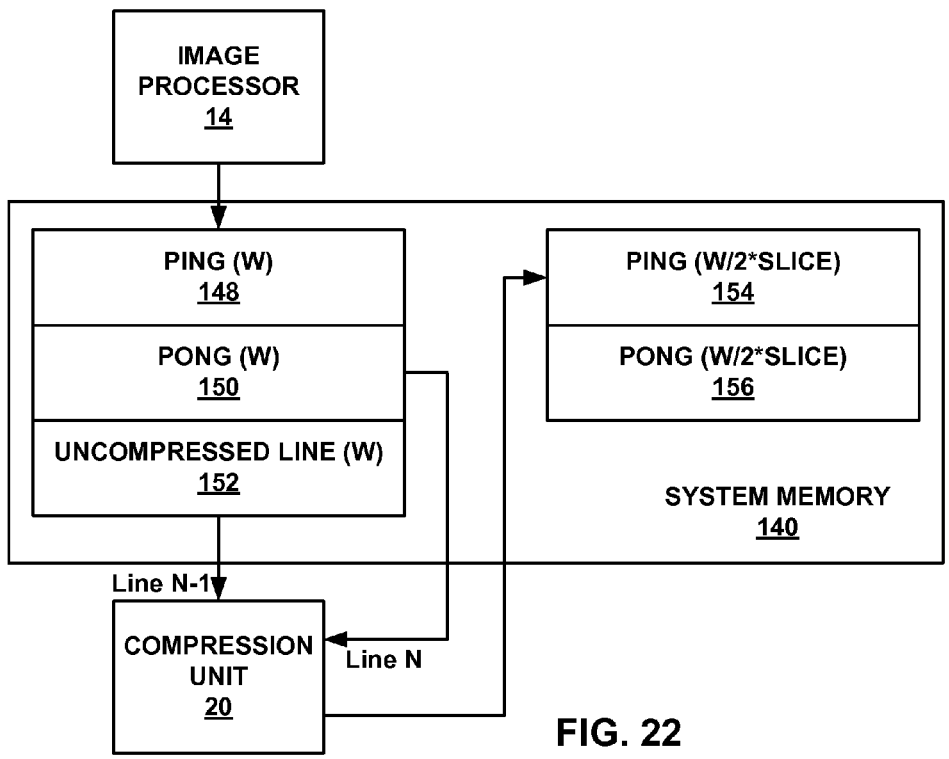

FIGS. 21 and 22 are block diagrams illustrating example manners in which an image processor transmits the color values to a compression unit. For example, as described above with respect to FIGS. 1A-1D and FIG. 2, compression unit 20 may receive the RGB color values from image processor 14, and in some examples may also receive the previous line for 2D prediction. FIGS. 21 and 22 illustrate examples way in which image processor 14 transmits such image data to compression unit 20.

For example, in FIG. 21, compression unit 20 receives the RGB color values from image processor 14, and compression unit 20 stores line N in uncompressed line (W) 146 of system memory 140. System memory 140 may be the system memory of the device that houses compression unit 20, and may be shared by the various components of the device. For example, system memory 140 may be part of devoce 12 (FIGS. 1B-1D) or panel devoce 16 (FIG. 1A), and may store data for different components within devoce 12 or panel devoce 16, as applicable.

In the example illustrated in FIG. 21, compression unit 20 may compress a line of the image frame. For example, if the length of a line is W, and compression unit 20 compresses the image data by 50%, then the resulting length of the compressed line may be W/2. Ping 142 and pong 144 may together form a ping-pong buffer that may store the compressed lines. For example, the size of the ping-pong buffer may be W/2. In ping-pong buffer, at any one time, one buffer may be outputting data from the buffer, while the other buffer is reading data to be stored in the buffer. After the buffer is done outputting data, the roles of the two buffers is switches. This switch may be accomplished by modifying the value of a pointer that indicates from where the data is to be outputted or where the data is to be stored.

The output of the ping-pong buffer may be the compressed image data. For example, in the examples illustrated in FIGS. 1A, 1B, and 1D, frame buffer 22 may receive the output of the ping-pong buffer (i.e., ping 142 and pong 144). In the example illustrated in FIG. 1C, decompression unit 24 may receive the output of the ping-pong buffer.

Also, the current uncompressed line stored in uncompressed line (W) 146 is line N-1 for the next line. In this example, compression unit 20 may receive line N-1 from uncompressed line (W) 146 for purposes of prediction. Compression unit 20 may also store the current line N in uncompressed line (W) 146. For example, when the compressed image frame data stored in ping 142 is outputted to pong 144, compression unit 20 may receive the line from uncompressed line (W) 146, which will now become line N-1, and compression unit 20 may store the current line N in uncompressed line (W) 146.

In the example of FIG. 21, compression unit 20 may compress the image frame on a line-by-line basis because to compress the entirety of the image frame may result in partial lines, which may incompatible with a scheduler tasked with scheduling access to system memory 140. Also, in the example of FIG. 21, system memory 140 may allocate up to 2*W memory locations, which may be minimum memory requirement for storing parts of the compressed image frame while compression unit 20 is in the process of compressing the image frame. In some examples, budget controller 54 of compression unit 20 may keep track of unused bits per line and may send fixed pattern, which may minimize power.

The example illustrated in FIG. 22 may be similar to the example illustrated in FIG. 21. However, in FIG. 22, image processor 14 may output the RGB color values to system memory 140. Compression unit 20 may receive the RGB color values from system memory 140, as well as, temporarily store the results of the compressed image frame in system memory 140. Also, the example illustrated in FIG. 22 may allow for compression unit 20 to compress image frame blocks on a slice instead of a line-by-line, where a slice is a plurality of lines.

For example, in FIG. 22, image processor 14 outputs the RGB color values to the ping-pong buffer that includes ping 148 and pong 150. Because these color values are uncompressed, the size of ping 148 and pong 150 may be sufficient to store a line of size W, as illustrated in FIG. 22. The output of pong 150 may be line N and the output of uncompressed line (W) 152 may be line N-1. For example, uncompressed line (W) 152 may receive line N from pong 150. Then, for the next line, which is now considered line N, uncompressed line (W) 152 may be considered as storing line N-1. Compression unit 20 may receive line N from pong 150 and line N-1 from uncompressed line (W) 152, and pong 150 may then store the current line N in uncompressed line (W) 152, which will become line N-1 for the next line.

Compression unit 20 may output the compressed image frame blocks to the ping-pong buffer that includes ping 154 and pong 156, in the example illustrated in FIG. 22. In this example, the size of the ping-pong buffer may be sufficient to store a slice of the image frame.

The example illustrated in FIG. 22 may require additional ping-pong buffers as compared to the example illustrated in FIG. 21. For example, FIG. 22 may require a second set of ping-pong buffers to smooth out variable bit rate. The memory requirement for the ping-pong buffers in the example of FIG. 22 may be (3*W+2*slice*W/2). For a slice that includes 4 lines, the memory requirement may be 7 W.

Figure 23:
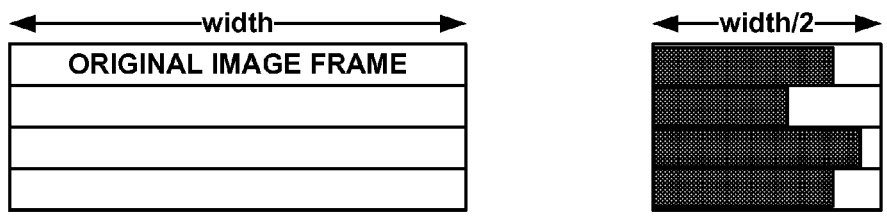
FIGS. 23 and 24 are conceptual diagrams illustrating the results of the compressing the image frame in accordance with aspects described in this disclosure.
Figure 24:
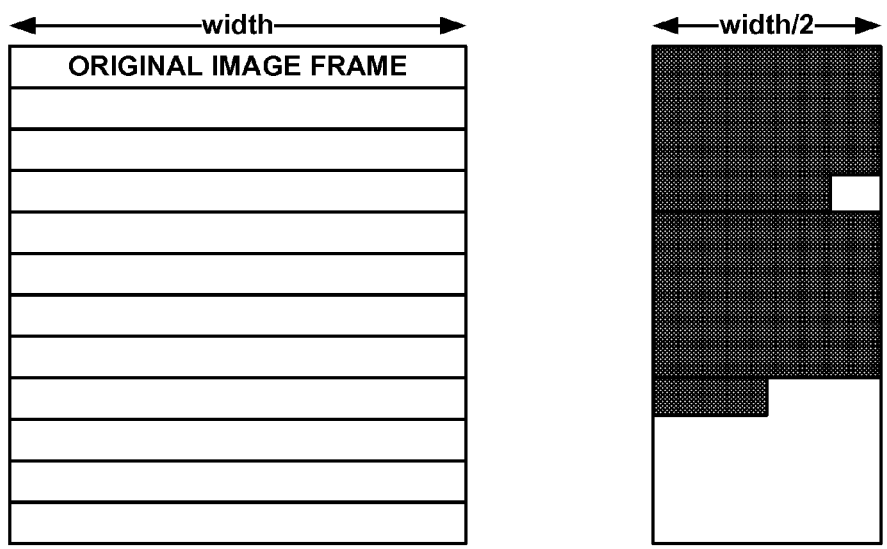

FIGS. 23 and 24 are conceptual diagrams illustrating the results of the compressing the image frame in accordance with aspects described in this disclosure. For example, FIG. 23 illustrates four lines of the original image frame, and the same four lines after compression. As illustrated, each of the four lines is compressed by more than 50%, with unused bits per line. The example of FIG. 24 illustrates 12 lines of the original image frame. In this example, four lines of the original image frame form a slice, resulting in three slices in the original image frame. As illustrated, each of the slices is compressed by more than 50%, with unused bits per slice. For example, in both FIGS. 23 and 24 the darkened portions of the compressed image frame indicate used bits and the white portions indicate unused bits.

Figure 25:
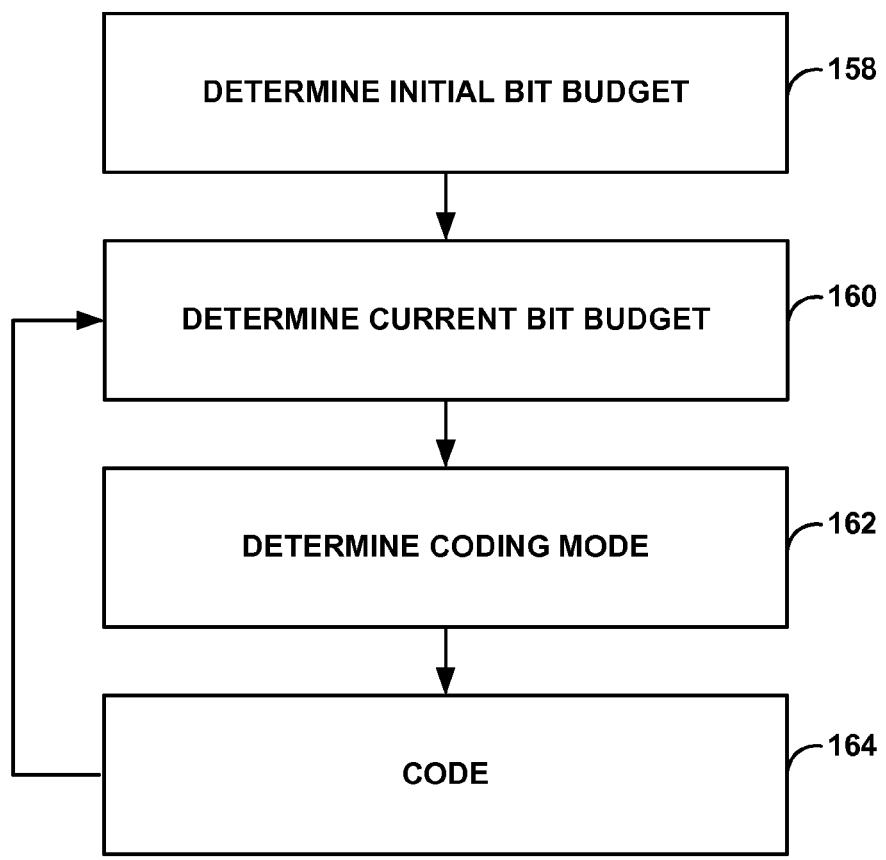
FIG. 25 is a flowchart illustrating an example operation in accordance with the techniques described in this disclosure.

FIG. 25 is a flowchart illustrating an example operation in accordance with the techniques described in this disclosure. For purposes of illustration, reference is made to FIG. 2.

A processor may determine an initial bit budget (158). For example, the processor may be image processor 14 or some other processor such as the CPU of devoce 12. The processor may determine the initial bit budget based on the average number of bits per block and the compressed bit threshold value. For example, the processor may determine the average number of bits per block, which is based on the target compression value. The processor may subtract the compressed bit threshold value from the average number of bits per block to determine the average extra bits per block. The processor may multiply the average extra bits per bock by a number of blocks within the image frame to determine the initial bit budget for the image frame.

Compression unit 20 may determine the current bit budget (160). The current bit budget for the first block of the image frame may be the initial bit budget summed with the compressed bit threshold value. Compression unit 20 may determine the current bit budget for a block subsequent to the first block by subtracting the number of bits of a previous compressed block from a previous bit budget, and summing the compressed bit threshold value to the result.

Compression unit 20 may determine the coding mode (162). For example, as described above, compression unit 20 may include a coding mode decision unit that may determine the manner in which to code the color values of the pixels within the block of the image frame. In some examples, the coding mode decision unit may determine different coding schemes for at least two of the components that form the color values of the pixels within the block of the image frame.

Compression unit 20 may then code the block (164). Compression unit 20 may then re-determine the bit budget for the current block based on the number of bits of the previous compressed block (e.g., the just compressed block). Compression unit 20 may repeat these steps until compression unit 20 compresses the entire image frame.

Figure 26:
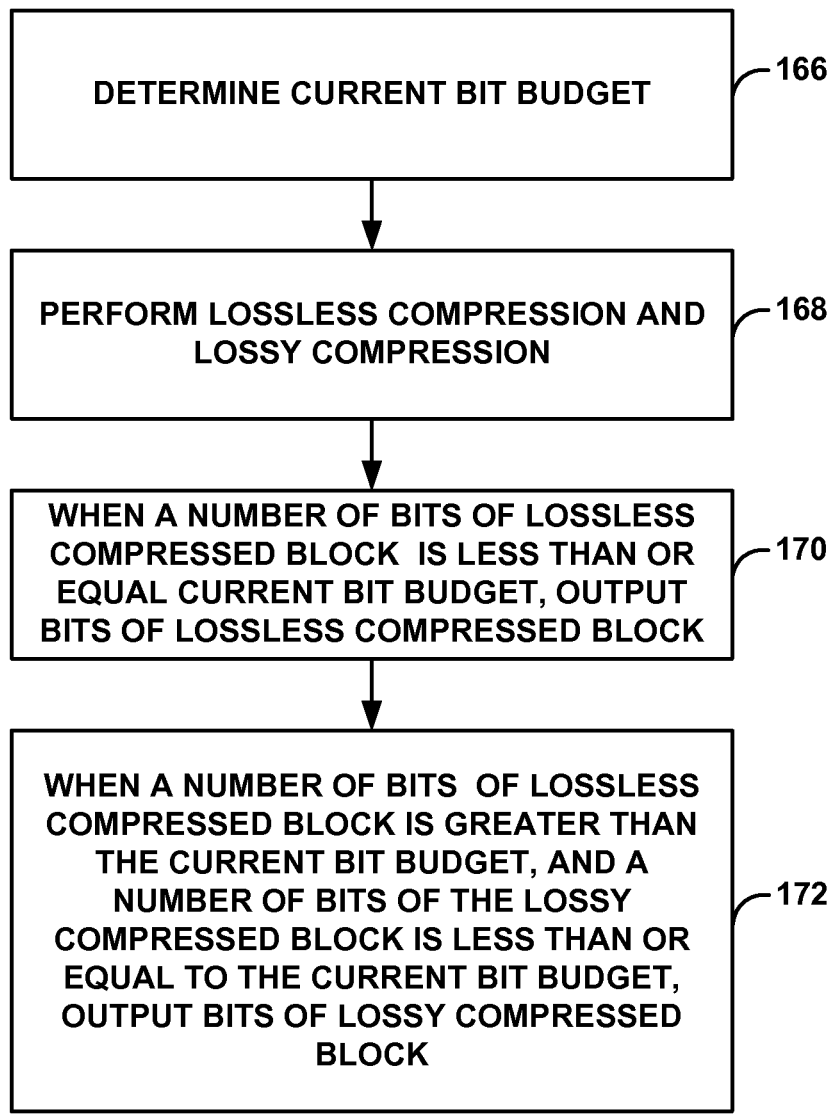
FIG. 26 is a flowchart illustrating another example operation in accordance with the techniques described in this disclosure.

FIG. 26 is a flowchart illustrating another example operation in accordance with the techniques described in this disclosure. For purposes of illustration, reference is made to FIG. 2.

Compression unit 20 may determine the current bit budget as described above (166). In some examples, compression unit 20 may determine the current bit budget for a current block of pixel values of the image frame based on an initial bit budget for the entire image frame. In some examples, compression unit 20 may determine the current bit budget for a current block of pixel values of the image frame based on an initial bit budget for a line of the image frame. In some examples, compression unit 20 may determine the current bit budget for a current block of pixel values of the image frame based on an initial bit budget for a slice of the image frame.

Compression unit 20 may perform lossless compression and lossy compression on the image frame block (168), and in some examples, at a same time. When a number of bits of the lossless compressed block is less than or equal to the current bit budget, compression unit 20 may output bits of the lossless compressed block (170). When a number of bits of the lossless compressed block is greater than the current bit budget, and a number of bits of the lossy compressed block is less than or equal to the current bit budget, compression unit 20 may output bits of the lossy compressed block 172). To output the bits of the lossy or lossless compressed block, compression unit 20 may store the bits in frame buffer 22 or output the bits to decompression unit 24.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising: determining, by using a compression circuitry, a compressed bit threshold value that indicates a number of bits that are available for compressing each block of pixel values of an image frame;
   determining, by using the compression circuitry, a target compression ratio;
   determining, by using the compression circuitry, a bit budget for an initial block of a portion of the image frame based on an initial bit budget for the portion of the image frame and the compressed bit threshold value, wherein the portion of the image frame includes a plurality of blocks, wherein the initial bit budget is based on a multiplication of a number of blocks in the portion of the image frame by a difference between an average number of bits per block and the compressed bit threshold value, and wherein the average number of bits per block is set to equal a number of bits per block based on the target compression ratio;
   determining, by using the compression circuitry, a current bit budget for a current block of pixel values, that is subsequent to the initial block in compression order, of the portion of the image frame, the current bit budget indicating how many bits are available for compressing the current block to achieve the target compression ratio, and
   determining the current bit budget includes subtracting a number of bits of a previously compressed block from a previous bit budget that was determined based on the bit budget for the initial block, the previous bit budget indicating how many bits were available to achieve the target compression ratio when a previous block of the portion of the image frame was compressed to generate the previously compressed block, and
   summing a result of the subtraction with the compressed bit threshold value to produce the current bit budget;
   performing a lossless compression on the current block, by using the compression circuitry, to generate a lossless compressed block; and
   when a number of bits of the lossless compressed block is less than or equal to the current bit budget, outputting, by using the compression circuitry, bits of the lossless compressed block.

2. The method of claim 1, further comprising:
   performing, with the compression unit, a lossy compression on the current block to generate a lossy compressed block; and
   when a number of bits of the lossless compression block is greater than the current bit budget, outputting, with the compression unit, bits of the lossy compression block.

3. The method of claim 2, wherein performing the lossy compression comprises:
   quantizing bits of the current block such that a number of the quantized bits is less than or equal to the current bit budget; and
   performing compression on the quantized bits.

4. The method of claim 3, further comprising:
   determining an amount of quantization to be applied based on the current bit budget,
   wherein quantizing bits comprises quantizing bits of the current block based on the determined amount of quantization such that the number of the quantized bits is less than or equal to the current bit budget.

5. The method of claim 2, wherein performing the lossy compression comprises performing the lossy compression at a same time as performing the lossless compression.

6. The method of claim 1, wherein performing the lossless compression comprises performing a first lossless compression, and the lossless compressed block comprises a first lossless compressed block, the method further comprising:
   performing a second, different lossless compression at a same time as the first lossless compression to generate a second lossless compressed block;
   performing a first lossy compression at the same time as the first lossless compression and the second lossless compression to generate a first lossy compressed block;

performing a second, different lossy compression at the same time as the first lossless compression, the second lossless compression, and the first lossy compression to generate a second lossy compressed block;

selecting the first lossless compressed block or the second lossless compressed block based on which one of the first lossless compressed block and the second lossless compressed block includes fewer bits;

selecting the first lossy compressed block or the second lossy compressed block based on which one of the first lossy compressed block and the second lossy compressed block includes fewer bits;

when a number of bits of the selected one of the lossless compressed block is less than or equal to the current bit budget, outputting bits of the selected one of the lossless compressed block; and when the number of bits of the selected one of the lossless compressed block is greater than the current bit budget, outputting bits of the selected one of the lossy compressed block.

7. The method of claim 6, further comprising:

quantizing bits of the current block such that a number of the quantized bits is less than or equal to the current bit budget, wherein performing the first lossy compression comprises performing a first compression on the quantized bits, and wherein performing the second lossy compression comprises performing a second, different compression on the quantized bits.

8. The method of claim 1, wherein outputting the bits of the lossless compressed block comprises storing the bits of the lossless compressed block in a frame buffer.

9. The method of claim 1, wherein outputting the bits of the lossless compressed block comprises transmitting the bits of the lossless compressed block to a decompression unit.

10. The method of claim 1, further comprising:

determining a next bit budget for a next block of the image frame by subtracting a number of bits of the lossless compressed block from the current bit budget, and summing a result of the subtraction with the compressed bit threshold value.

11. The method of claim 1, further comprising:

determining the average number of bits per block;

subtracting the compressed bit threshold value from the average number of bits per block to determine an average extra bits per block; and multiplying the average extra bits per block by a number of blocks within the image frame to determine the initial bit budget for the image frame.

12. The method of claim 11, wherein determining the bit budget for the initial block comprises adding the compressed bit threshold value to the initial bit budget to determine the bit budget for the initial block.

13. The method of claim 11, wherein determining the average number of bits per block comprises multiplying a number of bits per pixel with a number of pixels per block to determine a number of bits per block, and multiplying the number of bits per block with a target compression value.

14. The method of claim 1, wherein the portion of the image frame comprises the entire image frame, and wherein the initial bit budget comprises the initial bit budget for the entire image frame.

15. The method of claim 1, wherein the portion of the image frame comprises a line of the image frame, and wherein the initial bit budget comprises the initial bit budget for the line of the image frame.

16. The method of claim 1, wherein the portion of the image frame comprises a slice of the image frame, and wherein the initial bit budget comprises the initial bit budget for the slice of the image frame.

17. A system comprising:

an image processor configured to compose an image frame; and a compression circuitry, configured to:

determine, by using the compression circuitry, a compressed bit threshold value that indicates a number of bits that are available for compressing each block of pixel values of the image frame;

determine, by using the compression circuitry, a target compression ratio;

determine, by using the compression circuitry, a bit budget for an initial block of a portion of the image frame based on an initial bit budget for the portion of the image frame and the compressed bit threshold value, wherein the portion of the image frame includes a plurality of blocks, wherein the initial bit budget is based on a multiplication of a number of blocks in the portion of the image frame by a difference between an average number of bits per block and the compressed bit threshold value, and wherein the average number of bits per block is set to equal a number of bits per block based on the target compression ratio;

determine, by using the compression circuitry, a current bit budget for a current block of pixel values, that is subsequent to the initial block in compression order, of the portion of the image frame, the current bit budget indicating how many bits are available for compressing the current block to achieve the target compression ratio, and determining the current bit budget includes subtracting a number of bits of a previously compressed block from a previous bit budget that was determined based on the bit budget for the initial block, the previous bit budget indicating how many bits were available to achieve the target compression ratio when a previous block of the portion of the image frame was compressed to generate the previously compressed block, and summing a result of the subtraction with the compressed bit threshold value to produce the current bit budget;

perform a lossless compression on the current block, by using the compression circuitry, to generate a lossless compressed block; and when a number of bits of the lossless compressed block is less than or equal to the current bit budget, output, by using the compression circuitry, bits of the lossless compressed block.

18. The system of claim 17, wherein the compression unit is configured to:

perform a lossy compression on the current block to generate a lossy compressed block; and when a number of bits of the lossless compression block is greater than the current bit budget, output bits of the lossy compression block.

19. The system of claim 18, wherein the compression unit is configured to quantize bits of the current block such that a number of quantized bits is less than or equal to the current bit budget, and perform compression on the quantized bits to perform the lossy compression.

20. The system of claim 19, wherein the compression unit is configured to:

determine an amount of quantization to be applied based on the current bit budget; and quantize bits of the current block based on the determined amount of quantization such that the number of the quantized bits is less than or equal to the current bit budget.

21. The system of claim 18, wherein the compression unit is configured to perform the lossy compression at a same time as the lossless compression.

22. The system of claim 17, wherein the lossless compression comprises a first lossless compression, and the lossless compressed block comprises a first lossless compressed block, and wherein the compression unit is configured to:
perform a second, different lossless compression at a same time as the first lossless compression to generate a second lossless compressed block;
perform a first lossy compression at the same time as the first lossless compression and the second lossless compression to generate a first lossy compressed block;
perform a second, different lossy compression at the same time as the first lossless compression, the second lossless compression, and the first lossy compression to generate a second lossy compressed block;
select the first lossless compressed block or the second lossless compressed block based on which one of the first lossless compressed block and the second lossless compressed block includes fewer bits;
select the first lossy compressed block or the second lossy compressed block based on which one of the first lossy compressed block and the second lossy compressed block includes fewer bits;
when a number of bits of the selected one of the lossless compressed block is less than or equal to the current bit budget, output bits of the selected one of the lossless compressed block; and
when the number of bits of the selected one of the lossless compressed block is greater than the current bit budget, output bits of the selected one of the lossy compressed block.

23. The system of claim 22, wherein the compression unit is configured to:
quantize bits of the current block such that a number of the quantized bits is less than or equal to the current bit budget;
perform a first compression on the quantized bits to perform the first lossy compression; and
perform a second, different compression on the quantized bits to perform the second lossy compression.

24. The system of claim 17, further comprising a device that includes the image processor, and a panel device that includes the compression unit.

25. The system of claim 17, further comprising a device that includes the image processor and the compression unit.

26. The system of claim 17, wherein the compression unit stores the bits of the lossless compressed block in a frame buffer to output the bits of the lossless compressed block.

27. The system of claim 17, wherein the compression unit transmits the bits of the lossless compressed block to a decompression unit to output the bits of the lossless compressed block.

28. The system of claim 17, wherein the compression unit is configured to:
determine a next bit budget for a next block of the image frame by subtracting a number of bits of the lossless compressed block from the current bit budget, and summing a result of the subtraction with the compressed bit threshold value.

29. The system of claim 17, wherein the portion of the image frame comprises the entire image frame, and wherein the initial bit budget comprises the initial bit budget for the entire image frame.

30. The system of claim 17, wherein the portion of the image frame comprises a line of the image frame, and wherein the initial bit budget comprises the initial bit budget for the line of the image frame.

31. The system of claim 17, wherein the portion of the image frame comprises a slice of the image frame, and wherein the initial bit budget comprises the initial bit budget for the slice of the image frame.

32. A device comprising a compression unit, wherein the compression unit comprises circuitry and is configured to:
receive an image frame;
determine, with the compression unit, a target compression ratio;
determine, with the compression unit, a compressed bit threshold value that indicates a number of bits that are available for compressing each block of pixel values of the image frame;
determine, with the compression unit, a bit budget for an initial block of a portion of the image frame based on an initial bit budget for the portion of the image frame and the compressed bit threshold value, wherein the portion of the image frame includes a plurality of blocks, wherein the initial bit budget is based on a multiplication of a number of blocks in the portion of the image frame by a difference between an average number of bits per block and the compressed bit threshold value, and wherein the average number of bits per block is set to equal a number of bits per block based on the target compression ratio;
determine, with the compression unit, a current bit budget for a current block of pixel values, that is subsequent to the initial block in compression order, of the portion of the image frame, the current bit budget indicating how many bits are available for compressing the current block to achieve the target compression ratio, and
determining the current bit budget includes subtracting a number of bits of a previously compressed block from a previous bit budget that was determined based on the bit budget for the initial block, the previous bit budget indicating how many bits were available to achieve the target compression ratio when a previous block of the portion of the image frame was compressed to generate the previously compressed block, and
summing a result of the subtraction with the compressed bit threshold value to produce the current bit budget;
perform a lossless compression on the current block, with the compression unit, to generate a lossless compressed block; and
when a number of bits of the lossless compressed block is less than or equal to the current bit budget, output, with the compression unit, bits of the lossless compressed block.

33. The device of claim 32, wherein the compression unit is configured to:
perform a lossy compression on the current block to generate a lossy compressed block; and
when a number of bits of the lossless compression block is greater than the current bit budget, output bits of the lossy compression block.

34. The device of claim 33, wherein the compression unit is configured to quantize bits of the current block such that a number of quantized bits is less than or equal to the current bit budget, and perform compression on the quantized bits to perform the lossy compression.

35. The device of claim 34, wherein the compression unit is configured to:
    determine an amount of quantization to be applied based on the current bit budget; and
    quantize bits of the current block based on the determined amount of quantization such that the number of the quantized bits is less than or equal to the current bit budget.

36. The device of claim 33, wherein the compression unit is configured to perform the lossy compression at a same time as the lossless compression.

37. A non-transitory computer-readable storage medium including instructions stored thereon that when executed cause one or more processors to:
    determine a compressed bit threshold value that indicates a number of bits that are available for compressing each block of pixel values of the image frame;
    determine, by using a compression circuitry, a target compression ratio;
    determine a bit budget for an initial block of a portion of the image frame based on an initial bit budget for the portion of the image frame and the compressed bit threshold value, wherein the portion of the image frame includes a plurality of blocks, wherein the initial bit budget is based on a multiplication of a number of blocks in the portion of the image frame by a difference between an average number of bits per block and the compressed bit threshold value, and wherein the average number of bits per block is set to equal a number of bits per block based on the target compression ratio;
    determine a current bit budget for a current block of pixel values, that is subsequent to the initial block in compression order, of the portion of the image frame, the current bit budget indicating how many bits are available for compressing the current block to achieve the target compression ratio, and
    determining the current bit budget includes subtracting a number of bits of a previously compressed block from a previous bit budget that was determined based on the bit budget for the initial block, the previous bit budget indicating how many bits were available to achieve the target compression ratio when a previous block of the portion of the image frame was compressed to generate the previously compressed block, and
    summing a result of the subtraction with the compressed bit threshold value to produce the current bit budget;
    perform a lossless compression on the current block, by using a compression circuitry, to generate a lossless compressed block; and when a number of bits of the lossless compressed block is less than or equal to the current bit budget, output bits of the lossless compressed block.

* * * * *